United States Patent [19]

Silverthorn, III et al.

[11] Patent Number: 4,764,863
[45] Date of Patent: Aug. 16, 1988

[54] HARDWARE INTERPRETER FOR FINITE STATE AUTOMATA

[75] Inventors: Lee J. Silverthorn, III, Paradise Valley, Ariz.; Philip A. Gaudette, Washington, D.C.; Arthur W. Holt, Annapolis, Md.; George G. Nacht, Columbia, Md.; Robert B. J. Warnar, Germantown, Md.

[73] Assignee: The United States of America as represented by the Secretary of Commerce, Washington, D.C.

[21] Appl. No.: 732,327

[22] Filed: May 9, 1985

[51] Int. Cl.⁴ .................................. G06F 11/30
[52] U.S. Cl. .................................. 364/200
[58] Field of Search ... 364/200 MS File, 900 MS File, 364/200, 900

[56] References Cited

U.S. PATENT DOCUMENTS

| 4,367,525 | 1/1983 | Brown et al. | 364/200 |
| 4,590,550 | 5/1986 | Eilert et al. | 364/200 |
| 4,597,057 | 6/1986 | Snow | 364/900 |
| 4,598,364 | 7/1986 | Gum et al. | 364/300 |

Primary Examiner—Gary V. Harkcom
Assistant Examiner—David L. Clark
Attorney, Agent, or Firm—Thomas Zack; Alvin Englert; Harold L. Novick

[57] ABSTRACT

Apparatus and method for monitoring transactions on a high speed interface bus and for selectively storing information about such transactions together with the time of such transaction and the state of the automation. The apparatus comprises two parallel memories for respectively storing a regular table and a default table, and a memory selector for choosing between the table data of the two memories. A bus trap stores data information obtained from the bus and compares the stored information with a stored data template. A transition detector receives control signals from the bus and generates clock signals used by other system elements upon the detection of a transition. A hash coder utilizes a hash key together with state information to generate an address for entering the regular table memory. A state latch stores an address provided by the memory selector for the default table. A sample collector and sample queue component stores the state information together with the data and control information obtained from the monitored bus and a time stamp provided by a time stamp generator. A DMA output control provides the sample information to a display computer. The method monitors the interface bus interactions and selectively stores the monitored data and control signals when an analysis of those signals indicate that a transition has occurred. Two parallel, distinct look-up tables store state information and default information and are substantially entered at the same time to provide separate sets of table data. One set of table data is chosen depending upon predetermined criteria.

13 Claims, 12 Drawing Sheets

STRAIGHTFORWARD
APPROACH

HASHING APPROACH

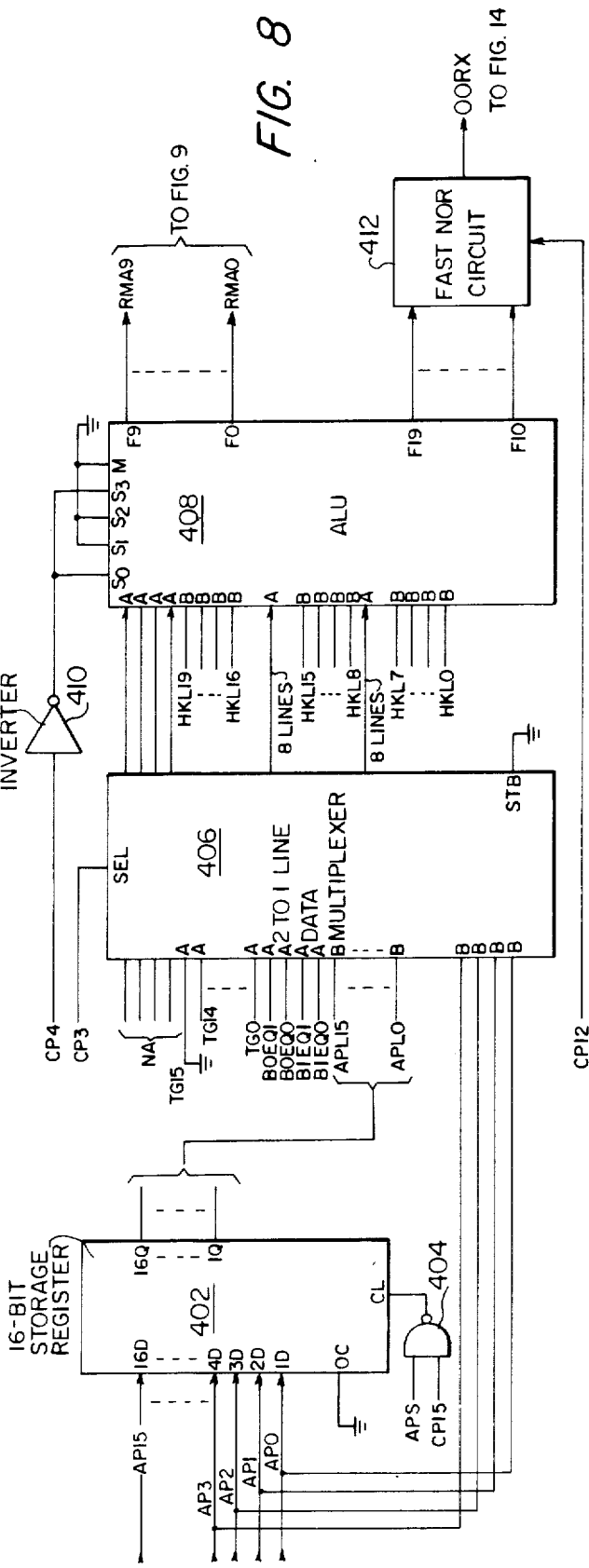

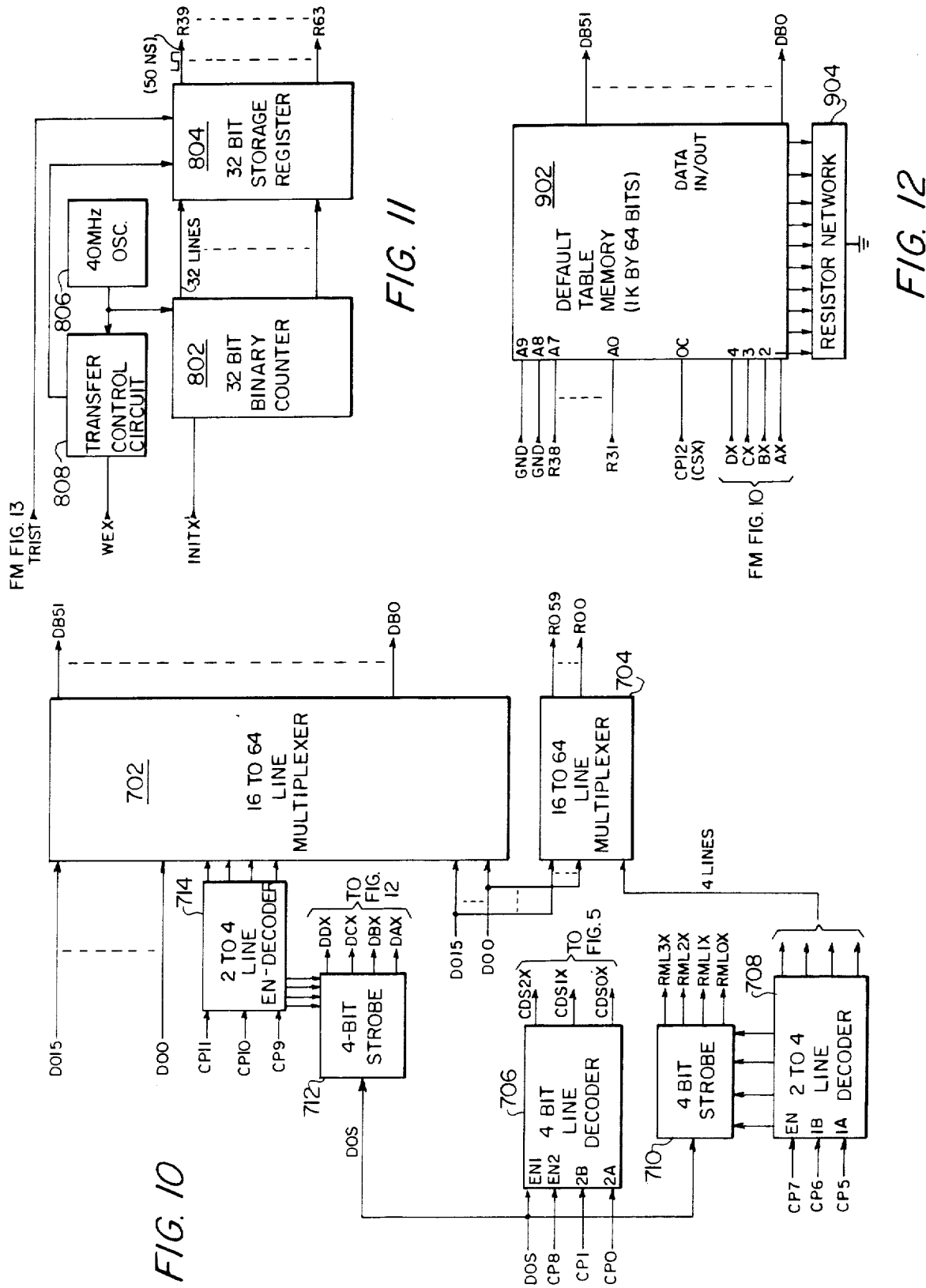

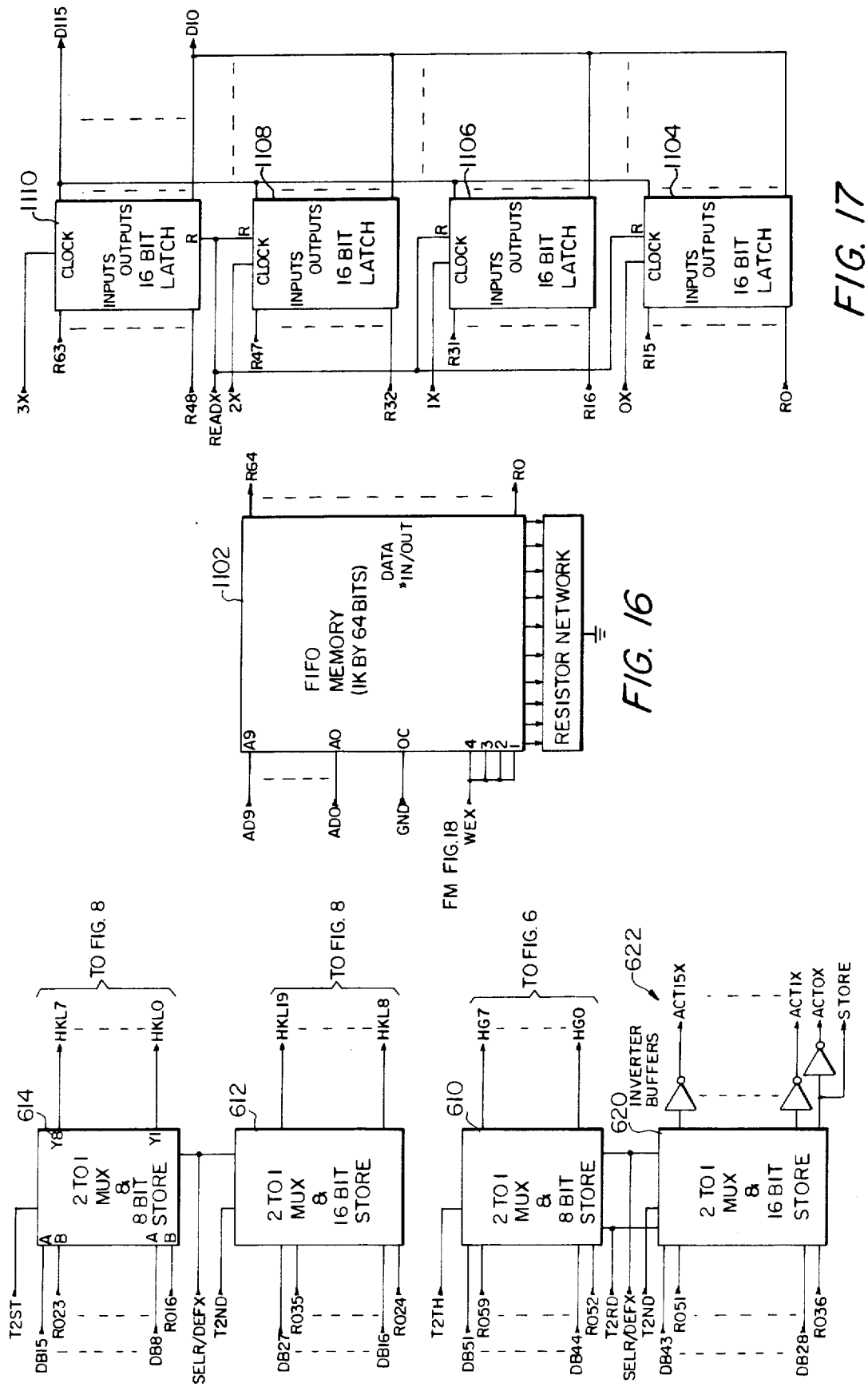

HARDWARE INTERPRETER FOR FINITE STATE AUTOMATA

FIELD OF THE INVENTION

The present invention relates to devices which automatically monitor electronic transactions, and more specifically relates to an electronic system for monitoring transactions on a high speed interface bus.

BACKGROUND OF THE INVENTION

In the present state of high speed, electronic communications, there are a variety of problems which require the power and flexibility of loadable, finite state automata as well as a fast interpreter cycle. There presently exists a broad class of fast and flexible electronic devices which must communicate with each other. The National Bureau of Standards (NBS) has established standards for the interface between the channels of main frame computers and the controllers of disk and tape devices. This has been published in three different publications entitled: I/O Channel Interface Standard (FIPS PUB 60); Operational Specifications for Magnetic Tape Subsystems (FIPS PUB 62); and Operational Specifications for Rotating Mass Storage Subsystems (FIPS PUB 63). These publications are available from the National Technical Information Service, Springfield, Va., and were published in 1979. However, there is the need for a passive monitor for the parallel bus used for this interface.

Standard logic analyzers provide various complex triggering schemes (such as disclosed in K101D/K102D Logic Analyzer Operations Manual by Gould, Inc. of Santa Clara, Calif. (1983)), and fast data capture before and after the trigger. But the trigger normally is an instantaneous pattern in the data being monitored, and there exists a limited capability for detecting sequences of patterns.

It is easy to build fast, static finite state automata to monitor interfaced bus interactions using standard electrical circuit components. In fact, a finite state automaton (FSA) model has been proposed which monitors the interactions on the bus, identifies key interactions, and selects appropriate actions at the key points. This FSA model is often used in the design of circuits. The resulting circuit, or FSA, is permanently defined, however, and changes to the state diagram may lead to major circuit changes.

It is also easy to build a slow, loadable FSA interpreter, using a microcomputer and software. Algorithms with various optimizations are widely known (See e.g., A. V. Aho and J. D. Ullman, "The Theory of Parsing, Translation, and Compiling" Vol. 1: Parsing (Prentice-Hall 1972) and A. V. Aho and J. D. Ullman, "Principles of Compiler Design" (Addison Wesley 1977)). There are probably literally thousands of programs using these techniques. For example, many compilers use an FSA for scanning and classifying an input as identifiers, numeric literals, special characters, etc. (See e.g., P. M. Lewis II, D. J. Rosenkrantz and R. E. Stearns, "Compiler Design Theory," (Addison Wesley 1976)). One standard software technique uses a table stored in memory to define an FSA, and an algorithm used to interpret this table. This interpreter, however, is implemented in software and is thus quite slow and usually requires a large amount of memory space.

It has also been proposed to use a partitioned finite state automaton as a hardware pattern matcher for large text retrieval systems (R. L. Haskins and L. A. Hollaar, "Operational Characteristics of a Hardware-Based Patterned Matcher, ACM Transactions on Database Systems," 1983). This hardware pattern matcher requires analysis of an FSA definition to construct loadable tables. It uses a rather unique method to achieve a fast, loadable FSA interpreter using reasonable memory requirements.

The finite state class of automata can be described in various ways for different purposes. However, for the present purpose, an FSA is comprised of:
- a set of states;
- a designation of an initial state;
- a set of input characters;
- a set of transitions from each state to the same or other states with a separate transition for each combination of state and input character; and
- an action associated with each transition which may produce external results, but does not affect the state.

Most FSA definitions also include a set of final states.

The straightforward implementation of FSA in software is a large rectangular table with a row for each state and a column for each input character. Each entry in the table contains a new state and an action. An interpreter uses a single table lookup for each cycle, and the result can be a table having an enormous size even for simple FSA definitions.

Most FSA's that arise in practice are sparse. Within a given state, only a few of the many possible input characters cause distinctive transitions. The transitions for all other input characters (for that state) are identical and may be lumped together as the default transition. Usually, the default transition for another state will be different.

Various optimizations of the straightforward implementation make use of such sparseness to reduce the size of the table by storing one default transition for each state and all the other non-default or regular transitions. The regular transitions can be stored in a linked list for each state. Alternatively, the state and input character can be hashed to index a scatter table of transitions with some method for resolving collisions. Such methods often require several table lookups to complete a single transition and a number of extra cycles is unbounded for some methods.

There therefore exists the need for a finite state automaton interpreter which can be loaded with the criteria for various FSA's so that a broad class of problems can be solved. Such an interpreter is particularly needed where higher speed is required than that available from a programmed, general-purpose digital computer.

SUMMARY OF THE INVENTION

The present invention provides a transaction analyzer that is particularly suitable for monitoring transactions on a high-speed interface bus as a fast, loadable, hardware interpreter for finite state automata. Such a device permits a designer to define a finite state automaton (FSA) that monitors the interactions on the bus, identifies key interactions, and selects appropriate actions at the key points. The present invention uses electronic hardware to interpret this FSA at fast enough rate to keep up with the interface bus. The present invention utilizes the full FSA model to specify smart triggers which recognize sequences, skip irrelevant inputs, make decisions, and perform other computations within the limits of the FSA model. In this manner, the present invention allows an unusual precision and complexity in detecting key bus interactions.

The present invention also captures data selectively under the explicit control of the designer's FSA, rather than using a simple clock to control sampling. In a specific embodiment of the present invention, each sample includes a high-resolution time stamp to preserve the timing relationships. In this way, the present invention coupled with the appropriate FSA can act as a data reduction filter, sampling the key data points and discarding the others.

However, the present invention can be adapted to even broader purposes. An innovative method is used to provide the power of the FSA model with a very fast cycle time, while using a reasonable amount of memory. In particular embodiments, such a device has many potential applications, especially where high speed recognition or data translation are required. For example, the present invention can operate as a smart trigger, a data reduction filter, a data translator, or a pattern matcher in a variety of problems.

In an apparatus according to the present invention, general purpose, commercially available hardware is utilized to implement the unique features of the present invention which result in a reduction of the interpreter cycle to a single memory read plus some overhead. This unusual speed is achieved without imposing severe practical restrictions on the FSA designer, and without using excessively large memories. The present invention does, however, require an analysis phase after an FSA is defined and before the FSA can be loaded.

Unlike many FSA applications, the present invention does not inherently depend on recognizing a pattern and halting, so that final states are not essential in the operation of the present invention. The present apparatus does allow appropriate transitions to indicate a halt bit in the action which achieves the effect of a final state whenever necessary.

The system according to the present invention provides the capability for a finite state automaton to be defined on-line by an operator to be loaded into the FSA interpreter section of the hardware, and to be executed at an extremely fast rate, which in a specific embodiment can be a 10 MHz rate. The class of automata that can be so loaded is extremely broad with a large number of states and with few restrictions. The number of states is the natural measure of size for a finite state automata. The restrictions that are imposed are carefully chosen to be of little concern in actual practice. The present invention overcomes the limitations that have been applied in research using the concept of a loadable finite state automaton interpreter executing at high speeds wherein there has always been a compromise for a restricted class of automata having a small upper limit on size. Those limitations arise because of enormous memory requirements inherent in the straightforward implementation.

The present system provides an interpreter having collision-free hashed finite state automaton in which a distinctive hashing method that relies on analysis of the FSA before loading for eliminating the possibility of the collisions. This method permits a drastic reduction in the memory size of the interpreter to a level that is quite practical on the one hand, and is still quite fast, on the other hand. Additionally, in a particular emobodiment, the method allows an upper bound of two interpreter cycles to process a single sample, with nearly all samples processed in a single cycle. At the same time, those few restrictions that are placed on the class of automata that can be interpreted, are not restrictions that have a practical importance.

The apparatus of the present invention overcomes the limitation or penalty of speed reduction frequently acceptable in software applications which utilize a hashed table access for FSA interpreters. Such software exploits the sparseness of most practical automata to reduce the memory size of the table with the resultant penalty that the number of table accesses for a particular input or sample is potentially unbounded, and on the average usually significantly larger than one. The present invention overcomes these limitations with preanalysis and with its unusual keyed hash coding hardware. The present invention uniquely utilizes the critical cooperation between hardware and software complements.

In a specific embodiment of the present invention, the method and apparatus incorporate the utilization of a parallel table lookup whereby two candidate entries from two distinct tables are selected and then a single choice is made between them. The table lookups, and to some extent the decision logic that makes the choice, are accomplished in parallel with the aid of separate hardware components. While the design may be somewhat complex, it does not impose any new restrictions or a marked increase in the hardware. The result is that the present invention effectively doubles, as a minimum, the speed of the transaction interpreter.

In a further specific embodiment, the present invention utilizes a controlled, time stamped sampling. The present transaction analyzer interpreter samples the input data stream under the explicit control of the FSA that is being interpreted. Extra information is then attached to the sample, this information including a high resolution time stamp which permits the capture of selected information in a limited sample memory over vastly different time scales. However, the interpreter according to the present invention is inherently flexible with respect to the time scales of its input. The present invention can detect and record events that are separated by hundreds of nano seconds or by days in the same test run. The present invention is also inherently frugal in its use of sample memory, allowing only the recording of those events that are currently of interest. Because of the extra information in the sample, these advantages are realized without any loss of useful information. Furthermore, capability such as triggering other instruments, perturbing the inputs for an active monitor, or performing actions for new types of instruments are quite feasible.

It is therefore an object of the present invention to provide an electronic system performance monitor which is one level more sophisticated than state-of-the-art logic analyzers. Whereas the logic analyzers must be programmed with predetermined trigger information, the present invention is triggered every time the monitored device behaves in an unexpected manner. Such unexpected manners are predetermined through the use of an internal map constructed relative to the expected behavior of the monitored device. This map, and associated map used to provide information about unexpected operation, is programmable and permits the present invention to be applied to a variety of both complex and simple systems.

BRIEF DESCRIPTION OF THE DRAWINGS

FIG. 6 is a more detailed, electrical schematic block diagram of other parts of the transition detector component of the interpreter circuit depicted in FIG. 3;

FIG. 8 is a more detailed, electrical schematic block diagram of the hash coder component of the interpreter circuit depicted in FIG. 3;

FIG. 9 is a more detailed, electrical schematic block diagram of the regular Table component of the interpreter circuit depicted in FIG. 3;

FIG. 10 is a more detailed, electrical schematic block diagram of the load control component of the interpreter circuit depicted in FIG. 3;

FIG. 11 is a more detailed, electrical schematic block diagram of the time stamp generator component of the interpreter circuit depicted in FIG. 3;

FIG. 12 is a more detailed, electrical schematic block diagram of the default Table component of the interpreter circuit depicted in FIG. 3;

FIG. 15 is a more detailed, electrical schematic block diagram of still further parts of the memory selector component of the interpreter circuit depicted in FIG. 3;

FIG. 16 is a more detailed, electrical schematic block diagram of part of the sample collector and sample queue component of the interpreter circuit depicted in FIG. 3;

FIG. 17 is a more detailed, electrical schematic block diagram of further parts of the sample collector and sample queue component of the interpreter circuit depicted in FIG. 3;

DETAILED DESCRIPTION OF THE PRESENTLY PREFERRED EMBODIMENT

With reference now to the figures wherein like numerals are used to designate like components throughout the several views, a fast, loadable hardware interpreter or transaction analyzer according to a presently preferred embodiment of the present invention is disclosed.

Figure 1:
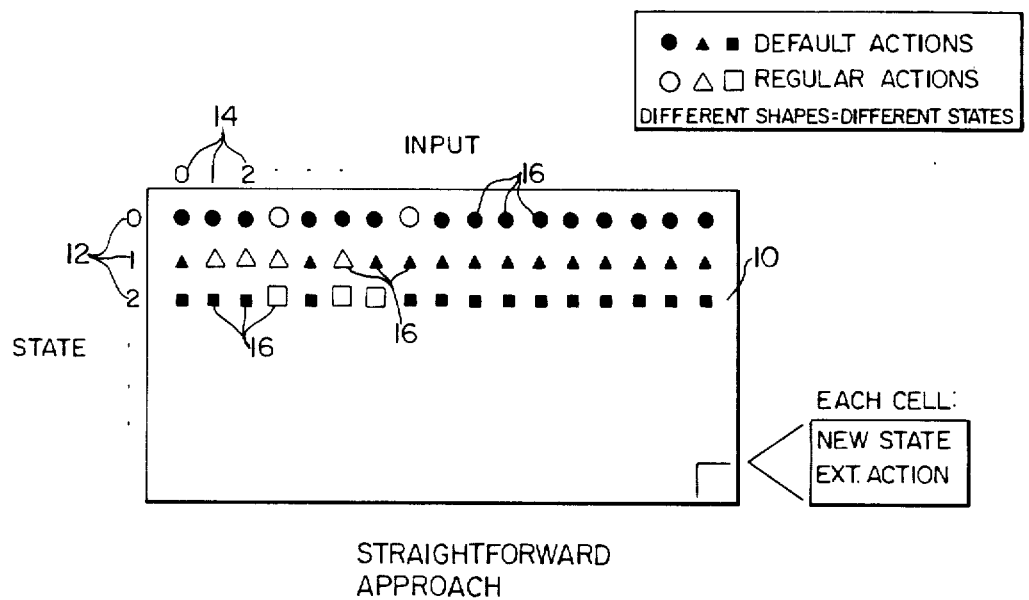
FIG. 1 is a diagramatic representation of a two-dimensional array depicting a memory table for storing entries in the straightforward implementation of a finite state automaton which is utilized by certain prior art solutions.
Figure 2:
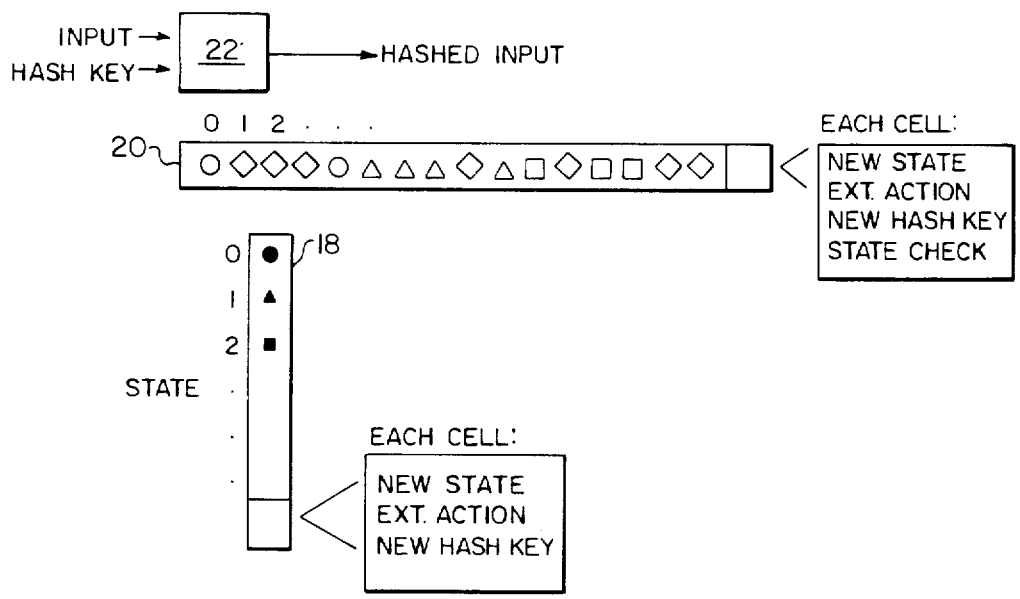
FIG. 2 is a diagramatic representation of single dimension arrays depicting a hashing method for implementation of a finite state automaton.

With reference to FIGS. 1 and 2, diagrams are provided which conceptually depict two different approaches to the problem of defining a finite state automaton and a method for monitoring the interactions on a bus. FIG. 1 depicts the straightforward approach, wherein every combination of state and input may result in a different action. This approach is shown as a two dimensional array 10 having a plurality of rows 12 with each row representing one state and a plurality of columns 14 with each column representing one input. Array 10 thus has a plurality of cells 16 which are defined by the intersection of a row 12 and a column 14. Each cell 16 of array 10 contains the new state and an external action.

In practice most of cells 16 in each row 12 of array 10 are identical. In FIG. 1, actions that are distinct are shown as white or open shapes and default actions are shown as black or darkened shapes. Each different shape represents a different state. All of the default actions are the same within each state. The default actions, however, for a different state are not normally the same.

FIG. 2 depicts the hashing approach in which only one default action is stored in an array 18 for each state. All of the regular actions are stored in an array 20 as a hash table and addressed by the result of a hash function. A hash function generator 22 uses the current input and a hash key, derived from the state, to produce an address into the regular action memory. Generator 22 also produces a signal to indicate whether the computed address was within the range of the memory. The hash keys for each state are chosen in such a way that no two regular actions need to be stored at the same hash address. The relationship among regular actions for one state must be preserved, but otherwise the regular actions may be placed anywhere within the memory that is not occupied by some other regular action.

The interpreter according to the present invention uses this variation of the hashing method in order to eliminate the possibility of a collision during the analysis phase. A different hash key is associated with each state, as mentioned above. In the interpreter cycle, the hash key (determined by the current state) and the input character are combined in generator 22 to index the table of regular transitions.

Each entry in the regular transition table contains a state check field to identify the state for which the entry is valid, along with the other necessary fields. If the input character corresponds to a regular transition for this state, the transition will be found at the hashed address in the table, and the state check value will match the current state. If not, the hash address may represent an address outside the boundaries of the table, or the entry may be empty, or it may be an entry for some other state (in which the state check value doesn't match). In any case, default transition is used.

The default transitions are stored in a separate table, described in greater detail herein below, directly indexed by the current state. The regular and default transition memories are separated in the interpreter, so that they can be accessed in parallel. After the read cycles are completed, a memory selector chooses between the two candidate transitions, based on whether the state check matches the current state and whether the hashing algorithm indicates out-of-range.

Each transition must contain the new state and an action. The regular transitions must contain a state check as well. The interpreter stores the new hash key with every transition. The same hash key appears with each transition (either default or regular) into a particular state, so that the new hash key is available as soon as the new state is determined. Alternatively, the hash keys could be stored more compactly in a separate table, indexed by the new state. The interpreter would then require two memory reads in series for each cycle, which has a concomitant drawback of a considerable penalty in speed.

Figure 3:
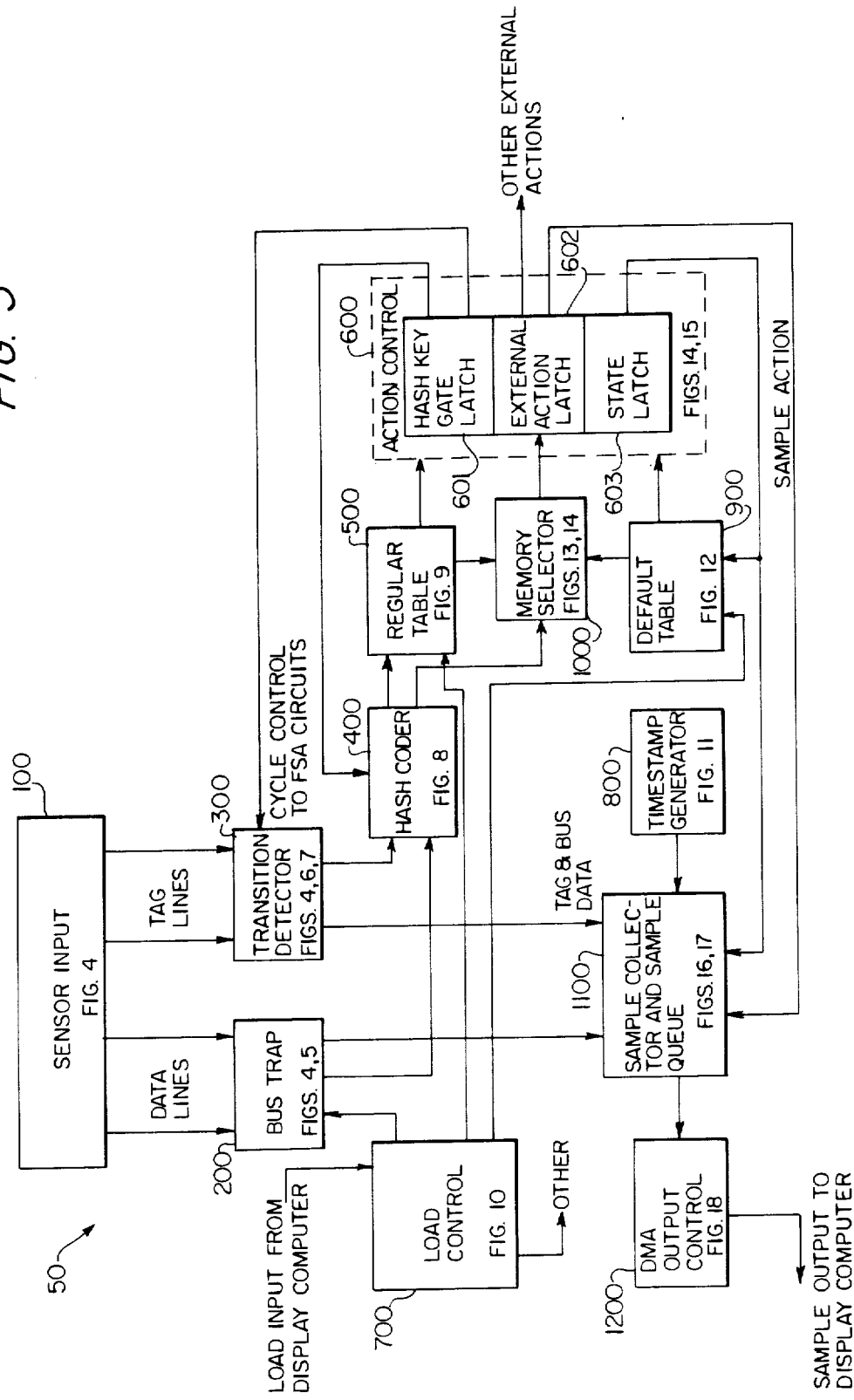
FIG. 3 is a schematic block diagram of a fast, loadable, hardware interpreter for finite state automata according to the present invention.

With reference now to FIG. 3, a block diagram of an interpreter 50 is depicted. Interpreter 50 includes a power supply unit (not shown) that includes a main, switching mode regulator, followed by a plurality of main, series regulators. The series regulators provide the main bus with +5 volts and −12 volts. Two supplemental series regulators, one generating −5.2 volts and the other −1.5 volts provide the necessary power for the Emitter Coupled Logic (ECL) circuits. The supplemental series regulators receive power from the −12 volt power supply. However, most of the circuitry of interpreter 50 uses conventional Transistor-Transistor Logic (TTL) which is powered from the +5 volt regulator. In a particular embodiment of interpreter 50, the total power requirements is about 85 watts.

Interpreter 50 as depicted in FIG. 3 has 12 components and each component is designated by one of the exact hundreds numbers from 100 to 1200. The individual element of the corresponding component, depicted in FIGS. 4 through 18 are then designated by numbers within the hundreds group which designates the component.

Data is provided or generated by the sensor probes and front-end component 100.

In a preferred embodiment of interpreter 50, the sensor probes use Field Effect Transistor (FET) circuitry that can be set to detect either ECL or TTL logic levels. Output levels from the probe FET circuits are ECL in nature and are converted to TTL levels in the front-end portion of component 100. There are 16 interface control probes, and associated lines called control lines or "tag lines" and 16 data sense probes or buses and associated data lines. (The probes are not shown in FIG. 3). Outputs from component 100 are connected to a bus trap component 200 and a transition detector component 300.

Bus trap component 200 stores patterns which are compared with the incoming data from component 100. The patterns are loaded by an operator with a display computer (discussed below with respect to FIG. 19). If matches are found, the results are encoded with hash gate information and then are transmitted to a hash coder component 400. The incoming data word is also double-buffered in bus trap 200.

Transition detector 300 is the cycle control for analyzer 50. Each time the control probes detect any transition on their inputs, the circuitry of transition detector 300 generates three sequential clock signals, T1, T2, and T3. The criteria for generating these clocks and their corresponding time delays depend on internally set options that can be chosen by the circuitry of transition detector 300 and discussed herein below with respect to FIG. 6. These options allow interpreter 50 to operate in low speed or high speed signal environments. This circuitry also contains a double-buffer. The tag word in the front buffer is encoded by the hash gates and the product is routed to the second buffer which acts as a hash coder. The tag word from this output buffer is then routed to other circuitry described herein below.

Hash coder 400 contains a 20-bit multiplexer adder. This 2-way multiplexer passes either bus and tag information to a regular action table or regular table memory 500 and a memory selector component 1000, or it passes information to these circuits during initialization from the aforementioned display computer through a load control component 700. In the latter case, load control component receives and passes the load inputs to the multiplexer. Load control component 700 also is used to load inputs to the default table 900 during initialization.

Regular table memory 500 and default table memory 900 are identical and can be contained on a single printed circuit card. In this way, the design, manufacturing, and troubleshooting of the system can be simplified. The circuitry uses sixteen 1024 by 4-bit random access memories (RAM) of the high performance, metal-oxide-semiconductor (MOS) circuit technology design. The address for regular table memory 500 is provided by hash coder 400, while the address for default table memory 900 is obtained from an action control component 600. Thus the regular address is constructed mainly from tag information while the address for the default memory is dependent on the state of the input signals.

Memory selector 1000 provides selected information to action control component 600 and selects data from either regular table memory 500 or default table memory 900. The information from the regular table memory 500 is chosen if the next expected state determined by the state check choice is as expected and is within range. Otherwise, memory selector 1000 selects the data from default table memory 900.

Action control component 600 contains three sections of latches, a hash key latch 601, an external action latch 602 and a state latch 603. Hash key latch 601 includes gate information that is used to encode the transition data before the data are transmitted through a multiplexer to a hash coder adder in hash coder 400. Hash key latch also includes information that is fed back to the hash coder adder for hashing the 20-bit, encoded transition data into the required 10-bit address for the regular table.

State latch 603 provides the address for the default table memory 900. The external action latches 602 provide specific, 1-bit, event data to initiate various functions. For instance, one bit, called the sample bit, causes sample collector and sample queue component 1100 to store all of its data inputs in one case. In addition, a bit is provided for use, if desired, to trigger an external function, such as an alarm.

Sample collector and sample queue component 1100 is comprised of a sample collector and a sample queue and collects various data and stores the data in a sample queue first-in-out (FIFO) memory under control of the system clocks and the action bits from external action latch 602. Data input and output of the FIFO memory occur on a 64-bit, three state bus. As soon as a transition is detected by the sensor probes, the sample collector controller of component 1100 causes a write cycle to occur. Writing overrides sample queue reading until the queue is "full." Once the queue is full, writing and reading occur on a first-come-first-served basis. Component 1100 also slices down the 64-bit, sample queue word sequentially to 4 16-bit words, which are then transmitted, in the DMA mode, to a DMA output control component 1200. Each 64-bit data word is time-stamped by a time-stamp generator 800 and the stamp is transmitted with its data to output control component 1200. The output from output control component 1200 is sent to the display computer, as described in greater detail hereinbelow.

In summary, finite state automaton interpreter 50 as shown in FIG. 3 includes sensor input component 100 to which electronic systems are connected for verifications. A bus trap component 200 receives the various incoming data patterns and compares them with stored data templates. When incoming data is recognized, codes are sent to a hash coder 400. A transition detector 300 generates system clocks upon the detection of any incoming transitions. Hash coder 400 gathers over 20 bits of information from current and new incoming data and generates an address for regular table memory 500. Regular table memory 500 contains a map of information that is used during the expected operation of the system being monitored. Action control component 600 contains a hash key latch 601, an external action latch 602 and a state latch 603 that are normally loaded from regular table memory 500 at each transition of the system being monitored. Component 600 also prepares information for the other components for the next state, triggers other functions and provides "state" information to sample component 1100 and, as an address, to default table memory 900. Default table 900 is accessed simultaneously with the access of regular table memory 500. Default table memory 900 contains a map of information that is used instead of regular data for proceeding with verification when an unexpected transition is encountered. A memory selector 1000 determines based on various inputs whether to choose the data from regular table memory 500 or the data from default table memory 900. Sample component 1100 stores 64 bits of data consisting of verification system input data, state data, and output data for transmission by a DMA output control component 1200. A time stamp is generated by time stamp generator 800 and is provided to sample component 1100, which also stores the time stamp along with the other data. The storage of this data is in response to a sample action which is an indication that something of interest has occurred in the input to interpreter 50. Output control 1200 takes the 64-bit word from sample component 1100 and transmits this via DMA in 16-bit words to a computer for analysis. A load control 700, which via a control port, a data port, and an address port of the display computer, is used to load interpreter 50 with the required information for commencing verification of a particular electronic system. A conventional power supply is used to power the components of interpreter 50.

Referring now to FIGS. 4 through 18, the specific elements of the components of interpreter 50 will now be described. Interpreter 50 in a particular embodiment is comprised of 12 circuit cards, each card having about 20 integrated circuits. These cards are mounted on a back plane or mother board (not shown). The first card contains the electronics for the sensor inputs and is depicted as part of FIG. 4. Sensor input component 100 contains circuits that are connected to the input probes of interpreter 50, which probes are conventional and are not shown. Component 100 is comprised of two level shifters, a first level shifter 102 for receiving up to 16 data inputs and a second level shifter 104 for receiving up to 16 control signals. Level shifters 102 and 104 convert the ECL probe signals to TTL signals utilized by the remaining circuits of interpreter 50. Each level shifter 102 and 104 contains 16 lines having either a true input or a false input. The data signals are signals that mainly contain data that are transferred between one system or system part and another, while control signals are those signals that promote the flow of the data signals.

The outputs from level shifters 102 and 104 are respectively connected to two sets of storage registers 202 and 204 for the data signals and 302 and 304 for the control signals. Each set of storage registers is comprised of two 16-bit parallel storage registers connected in series and which store bus information after clocks T1 and T2, respectively. In this way, the first storage register, 202 or 302, can be loaded with the next word and this double buffering expands the band width of interpreter 50. The double buffering also aids the speed of verification since two samples are taken for each input transition and data gathering is beneficial at that time. The outputs from storage registers 204 or 304 are made available under the command of signal TRIST, discussed below. This tri-state command is necessary because the memories of interpreter 50 have inputs on the same lines as the outputs, and therefore require having tri-state for signal isolation when the same lines are active with data from the memories.

Figure 5:
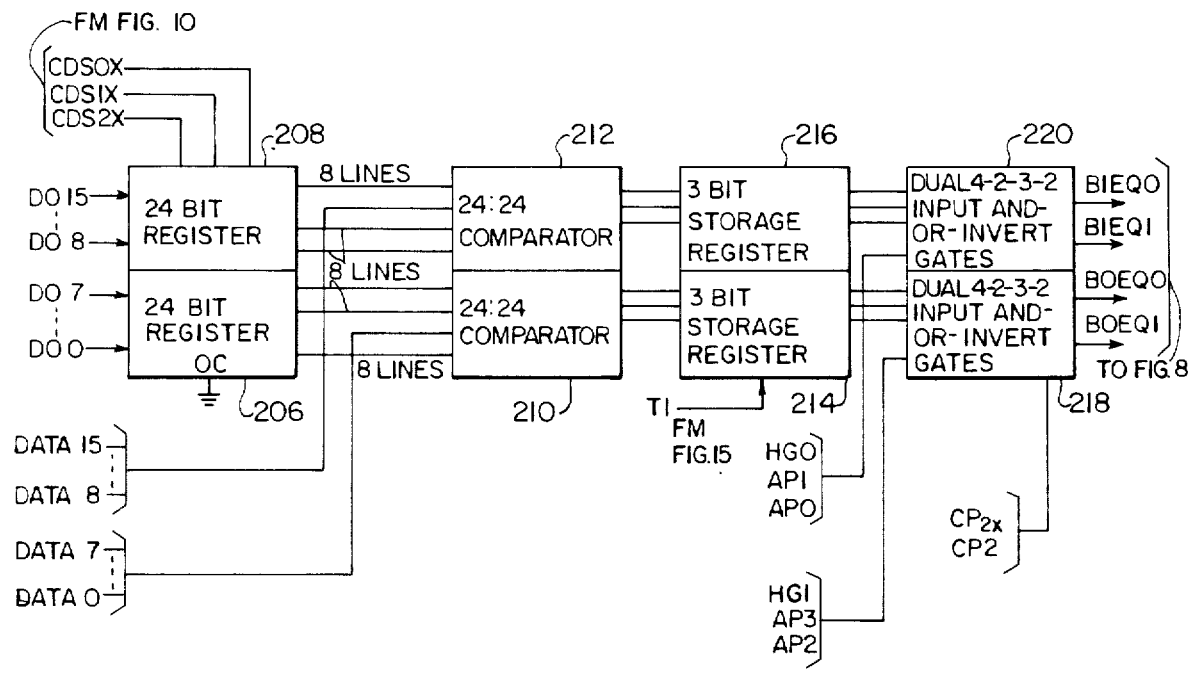
FIG. 5 is a more detailed, electrical schematic block diagram of other circuitry of the bus trap component of the interpreter circuit depicted in FIG. 3.

FIG. 5 depicts the remaining circuits of bus trap component 200. Signals DO 0 through DO 15 is a 16-bit word from a data output port, with the signals DO 0 through DO 7 being the lower 8-bits of data and signals DO 8 through DO 15 being the upper 8-bits of data. These data are stored in two 24-bit registers 206 and 208, which registers are controlled through signals CDS0X through CDS3X. The input words can be in any 24-bit configuration, and in the case of an input/output channel verification, these words can represent system status, address, etc. During system operation, actual operation parameters occur on data lines DO 0 through DO 7. The output from registers 206 and 208 are respectively connected to the inputs of two 24 by 24 comparators 210 and 212, respectively for the low and high data words. The results of the comparison from comparators 210 and 212 are stored in corresponding 3-bit storage registers 214 and 216. Storage registers 214 and 216 are latched on signal TI. The outputs from storage registers 214 and 216 are decoded to two bits in gates 218 and 220, respectively. Gates 218 and 220 are respectively 4-2-3-2 input AND-OR-INVERT gates. The outputs from gates 218 and 220 form the address to regular table memory 500. Signals HG1 and HG0 are used as a mask for negating unwanted data in gates 218 and 220, respectively. Both gates receive control signals $CP_2X$. In addition, each gate 218 and 220 respectively receives signals AP2 and 3 and AP0 and 1.

FIG. 6 depicts a hash gate selector 306 which is part of transition detector 300. Selector 306 is a conventional decoder that reduces its 21 inputs to 10 outputs. Inputs HG2 through HG7 are encoded with the stored control data TGL0 through TGL14 in order to provide the corresponding Boolean equation located on the right hand side of the diagram. This encoding allows the exclusion of signals which are not significant in a particular state. The inputs are received from input and hash gate latch information, while the outputs are sent to hash coder 400.

Figure 4:
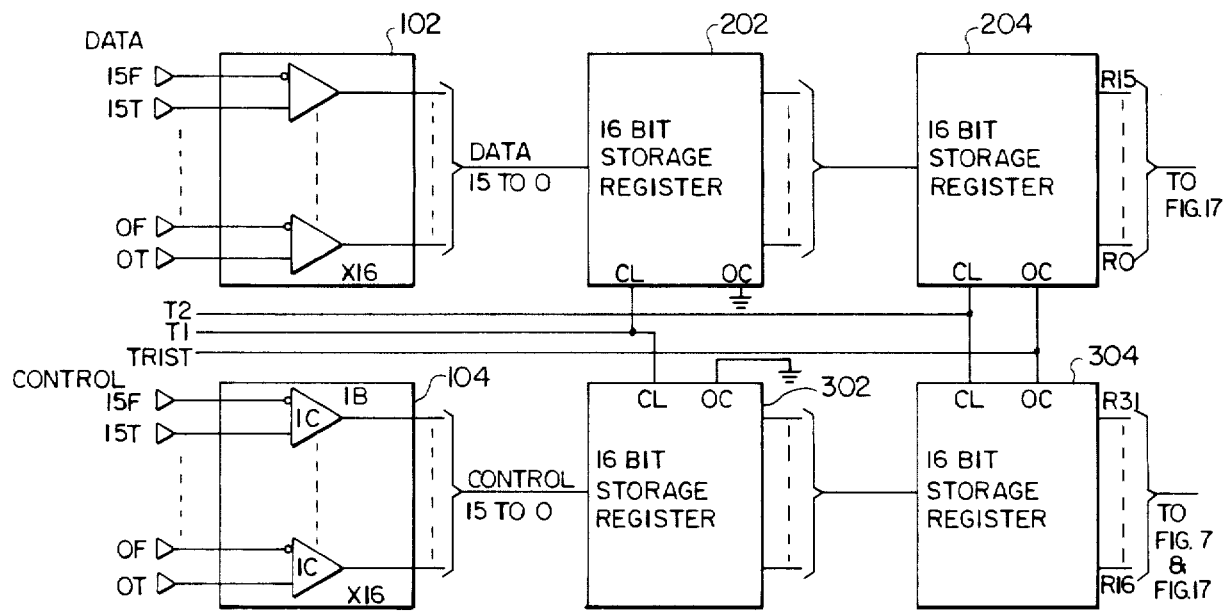
FIG. 4 is a more detailed, electrical schematic block diagram of the front end component and part of the bus trap and transition detector components of the interpreter circuit depicted in FIG. 3.
Figure 7:
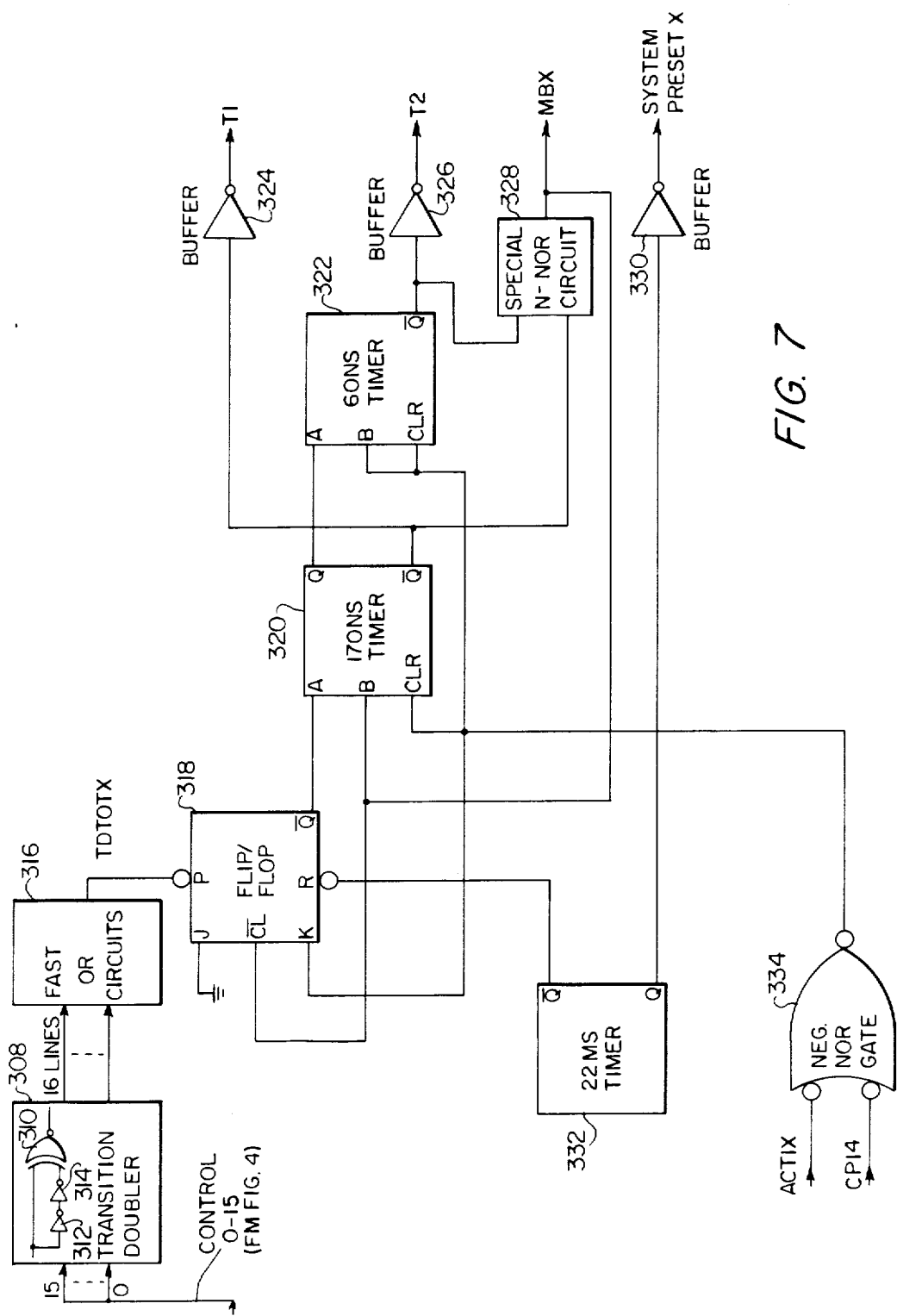
FIG. 7 is a more detailed, electrical schematic block diagram of still further parts of the transition detector component of the interpreter circuit depicted in FIG. 3.

Another part of transition detector 300 is depicted in FIG. 7. The output from storage register 304 in FIG. 4 is coupled to a transition doubler 308. Transition doubler 308 produces two transitions approximately 30 nanoseconds apart for each transition detected by the input probes. Transition doubler 308 is essentially comprised of 16 individual circuits, each circuit including a two-input exclusive NOR gate 310 with a direct connection one of the input gates and two serial inverters 312 and 314 in the path to the other input of gate 310. Thus, the inclusion of inverters 312 and 314 produces a 30 nanosecond delay on one of the inputs. Hence the signal arrives a little later on this input to gate 310 than on the other, thereby creating two transitions which form a pulse at the output for every input transition. The output from transition doubler 308 is coupled to the input of a plurality of fast OR circuits 316 which serialize the parallel 16 input signals. The output of OR circuits 310 is called signal TDTOTX, which is applied as an active "low" signal to the "set" input of a JK flip-flop 318. Flip-flop 318 is the input of the clock generation circuits of interpreter 50. The number of pulses which form signal TDTOTX is used to trigger a chain of one-shot flip-flops 320 (a 170 NS timer) and 322 (a 60 NS timer). The "Q" bar outputs from one-shots 320 and 322 are used to form signals T1 and T2 via two buffer inverters 324 and 326, respectively. A signal MBX is produced by special N-NOR circuit 328 whenever T1 or T2 is active. System presets are provided through a buffer 330 which receives a 22 millisecond pulse from timer 332 only upon system power-on. A negative NOR gate 334 provides a system lockout whenever signals ACT1X or CP14 are active "low."

The operation of the clock generation circuits in FIG. 7 is as follows. Upon system power-on, all flip-flops, 1-shots, registers, and other circuits are set in the correct state through buffer 330. Upon system operation, signal TDTOTX is generated and sent to clock flip-flop 318 indicating that a transition has been sent. Flip-flop 318 is then preset and the transition on its "Q" bar output starts timer or 1-shot 320 and signal T1 becomes true "high" for 170 ns. After 170 ns, the "Q" output of timer 320 becomes false "low" thereby triggering the input to 1-shot or timer 322. Signal T2 then becomes true "high" as a result of buffer 326 for a time of 60 ns. N-NOR circuit 328 produces signal MBX as a function of timers 320 and 322 timing out and prevents timer 320 from being retriggered while at the same time it resets flip-flop 318. The latter action allows flip-flop 318 to "store" another transition and start the cycle again once it has been timed out. Negative NOR gate 334 prevents clock generation when the two input signals are false. Signal ACT1X is used to prevent another clock cycle since the machine might not be ready at that time while CP14 holds off clock generation during the loading phase of interpreter 50. This latter action prevents any unwanted clocks from triggering interpreter 50.

The components of hash coder 400 are depicted in FIG. 8. A 16-bit storage register 402 receives 16 inputs AP0 through AP15 from the display computer (discussed in greater detail hereinbelow with respect to FIG. 19). Register 402 is used when the regular cable memory 500 is loaded from the display computer with the regular memory map during start-up. The input signals represent the loading address code for regular table memory 400. Input signals AP0 through AP15 are received from the display computer address port. Register 402 is cleared as the result of gating two signals with a NAND gate 404. A signal CP15 is sent from the display computer control port and the signal APS is received from the display computer after the data has settled on the output ports. After settling, the signal APS strobes register 402 and the 16-bit word is stored. In the next cycle, signals AP0 through AP3 are changed to form the last part of the regular table address code thereby forming 20 address code lines from a 16-bit input bus.

The addresses for regular table memory 500 are produced by a 2-to-1 line data multiplexer 406 providing selected input to a ALU408. These addresses are used during the writing and reading processes of regular table memory 500. There are two sets of inputs to multiplexer 406, the first set which is used only during the "load" mode is comprised of signals AP0 through AP3 and APL0 through APL15. These signals initiate the address to the regular table for regular map loading, as mentioned above. Multiplexer 406 receives a control signal CP3 from the display computer, which signal when false results in multiplexer 406 choosing signals BIEQ0,1 and BOEQ0,1, and choosing signals TG0 through TG15 as the address codes for the address of regular memory 500. Unused inputs of multiplexer 406 can be used for future expansion. The 20 outputs of multiplexer 406 are sent to ALU (arithmetic logic unit) 408 where signal HKL hash key is subtracted in two's complement from these outputs. The result is the 10-bit regular table address for memory 500.

This process is controlled by signal CP4 that has been inverted by inverter 410. In the "load" mode, signal CP4 is false and the loading address is then passed through ALU 408 without change. A fast NOR circuit 412 receives various inputs from ALU 408 based on machine and system verification limits. The output of NOR circuit 412 produces signal 00RX which alerts the system that current conditions are out-of-range for operation of interpreter 50. Signal OORX is also sent to memory selector 1000 where it plays a factor in choosing between the regular or default map data, as described hereinbelow. The principal output from ALU 408 are 10 signals, signals RMA0 through RMA9 which are used as inputs to regular table memory 500.

Regular table memory 500 is comprised of a 1K by 64-bit RAM memory 502. Memory 502 is divided into four sections and the appropriate section is selected with one of four RML signals. A resistor network 504 is connected between ground and memory 502 to provide increased stability for the memory components. Memory 502 has 60 inputs and 60 outputs, the outputs always being active. Data are sent to and received from memory 502 on the "RO" lines under control of signals RML0X through RML3X and of signals RMA0 through RMA9 address signals received from hash coder 400. Also, in this embodiment, only 60 inputs and outputs are used with four inputs and outputs being reserved for future expansion. The input/output lines are connected to memory selector 1000 where the data on these lines are used or not used in the next interpreter cycle, as described hereinbelow.

Default table memory 900 is depicted in FIG. 12 and is comprised of a 1K by 64-bit RAM memory 902. Memory 902 is identical to memory 502 and also includes a resistor network 904. Default table memory 902 has a 10-bit address, A0 through A9, with two lines not being used and being kept for expansion. Input signals R31 through R38 are used to supply the address range. Signals AX through DX select the four sections of the memory map to be loaded and signal CP12 (which is grounded in memory 502) allows output data DB0 through DB51 to be active when memory 902 is being read. The output from memory 902 is sent to memory selector 1000.

A plurality of 2-to-1 multiplexers 620, 610, 612, and 614, as depicted in FIG. 15, are connected at their inputs to the outputs of memories 502 and 902. One set of memories are selected for the output of the multiplexers depending upon the state of signals SELR/DEFX and T2TH, T2RD, T2ND, and T2ST. The output data are the hash gate and external actions. One of the external actions is the signal STORE generated by multiplexers 620 and another is the hash key which is sent back to hash coder 400 as signals HKL0 through HKL19. The hash key is used to set up the conditions for hashing in the next regular map address. Multiplexer 610 selects either the regular signals DB or the default signals RO data and stores them on clock pulses T2RD and T2TH respectively. The output is the hash gate which is sent back to transition detector 300 where it is used to activate or deactivate selected control information. All of the outputs from multiplexer 620, except for signal STORE, are inverted by a plurality of inverters 622 and, as inverted, represent the external actions. The signals are used as triggers to other equipments, such as alarms or logic analyzers. Signal STORE is sent to sample component 1100 for loading one of its memory elements. In this way, interesting conditions are loaded in the Queue of sample component 1100 (64 bits worth) together with an associated time stamp, as described hereinbelow.

Figure 13:
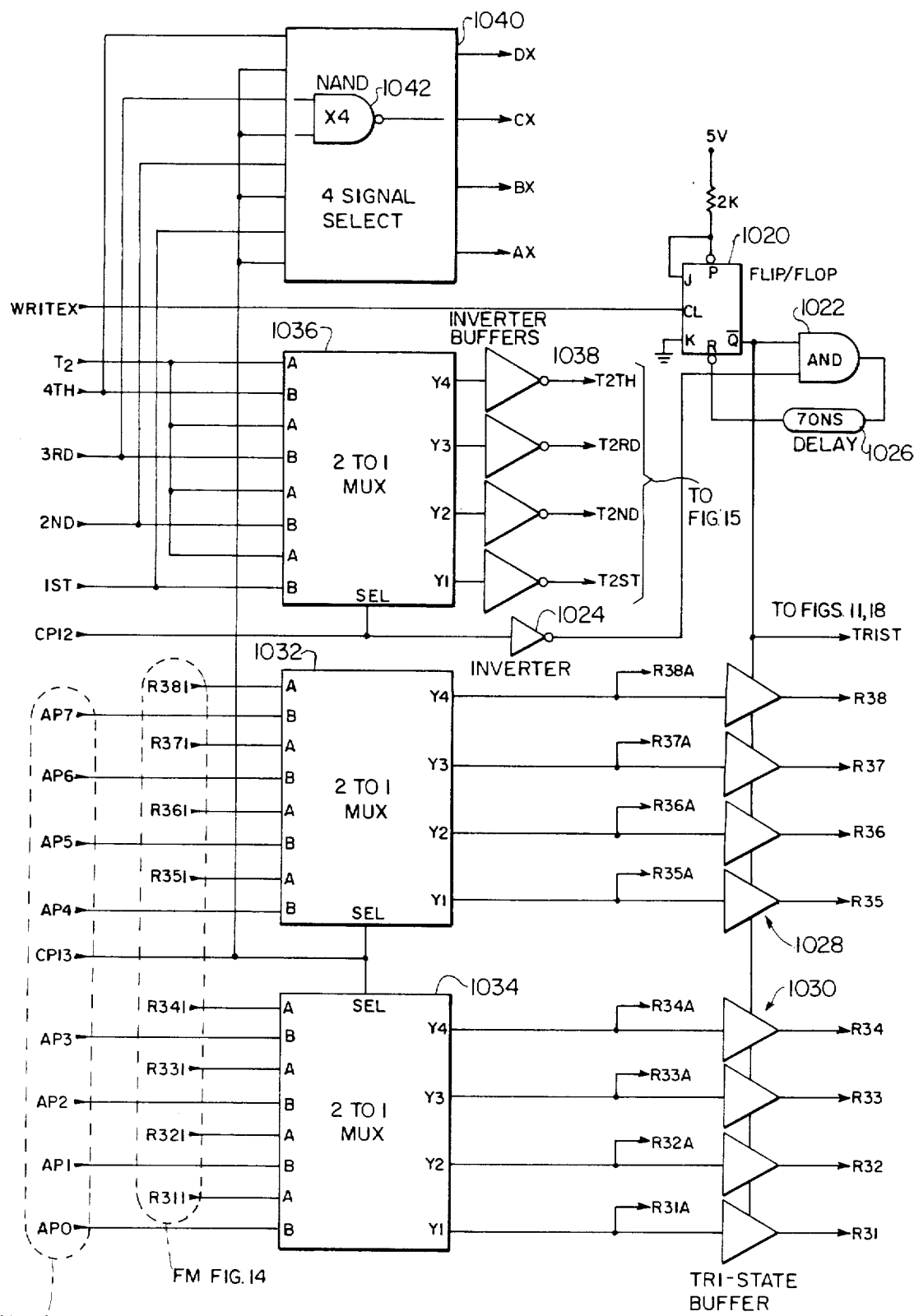
FIG. 13 is a more detailed, electrical schematic block diagram of part of the memory selector component of the interpreter circuit depicted in FIG. 3.
Figure 14:
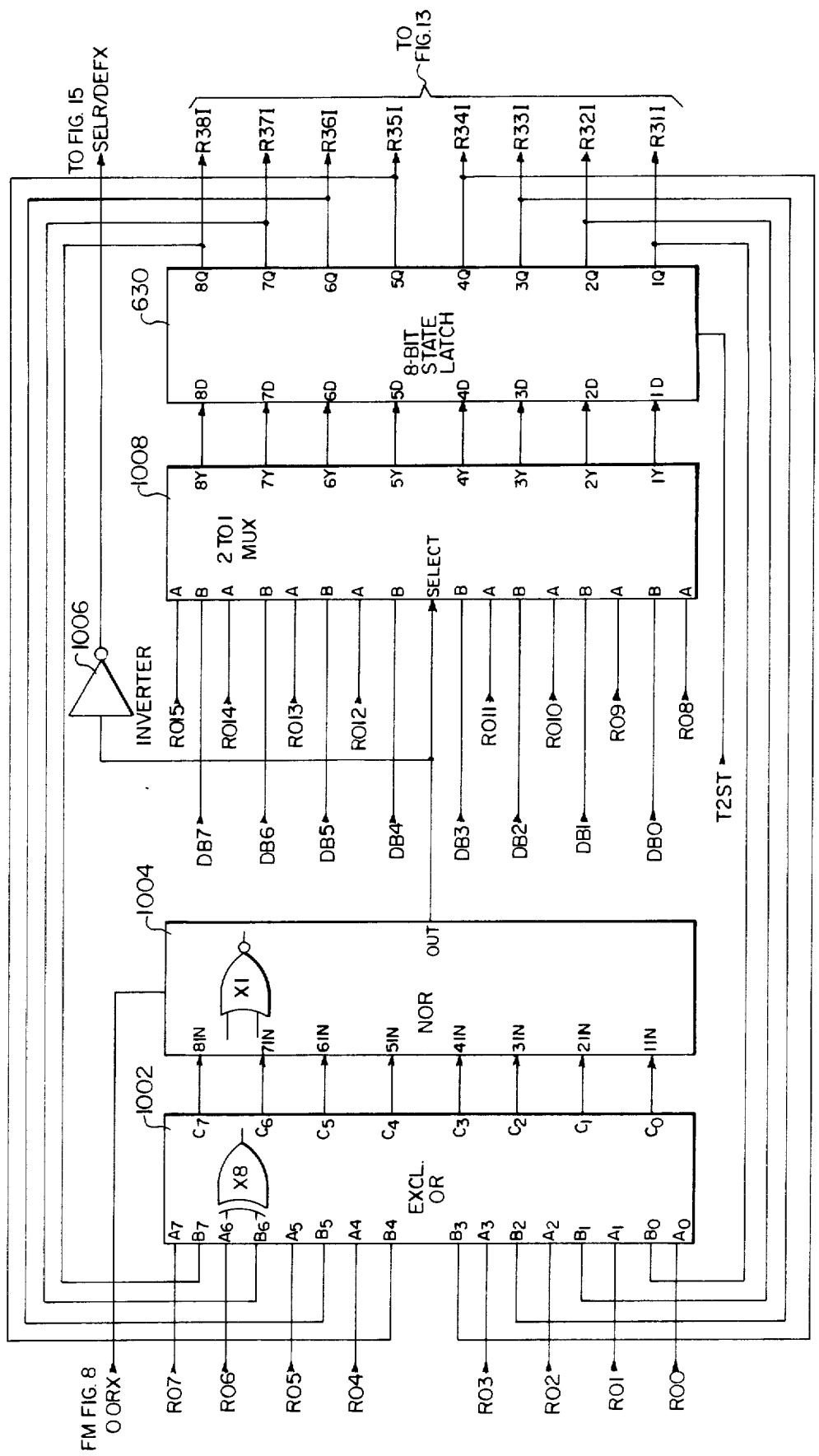
FIG. 14 is a more detailed, electrical schematic block diagram of other parts of the memory selector component of the interpreter circuit depicted in FIG. 3.

The signals for selecting which data are to be latched in action control components 600 are determined by the circuitry in FIG. 13 and the critical circuitry in FIG. 14. Several important signals are generated in FIG. 14. One, signal OORX, discussed above, immediately selects the default table memory 900 whenever unexpected conditions are detected. The circuit is comprised of a group of eight exclusive OR gates 1002 which outputs are connected to the inputs of a NOR gate 1004. The single output of gate 1004 is inverted by an inverter 1006 and produces signal SELR/DEFX. In addition, the output from gate 1004 is sent to the "select" line of a multiplexer 1008. Multiplexer 1008 is a 2-to-1 multiplexer that selects between regular memory output lines R08 through R015 from memory 502 or from lines DB0 through DB7 from default memory 902. The outputs from multiplexer 1008 are sent to a state latch 630, which is part of action control 600. The data are latched into latch 630 when signal T2ST is active. The 8-bit outputs from latch 630 comprise signals R31I through R38I and are returned to the second input of the exclusive OR gates in gate 1002. In addition, these outputs form the address for default memory 902 if selected by multiplexers in memory selector 1000 (See FIG. 13).

With reference now to FIG. 13, a signal WRITEX is used to clock a JK flip-flop 1020, the Q bar output of which is used as one input to a two input AND gate 1022. The other input of AND gate 1022 is provided by the inversion of signal CP12, produced by inverter 1024. The output from AND gate 1022 is fed through a 70 nanosecond delay 1026 to the reset input of flip-flop 1020. The Q bar output from flip-flop 1020 also produces signal TRIST. Signal TRIST is used to control a plurality of tri-state output buffers 1028 and 1030.

Two multiplexers 1032 and 1034, which are 2-to-1 multiplexers, receive and select from input signals AP0 through AP7 or R31I through R38I. The output from multiplexers 1032 and 1034 provide the inputs, respectively, to tri-state buffers 1028 and 1030. The selection of the two sets of data is made by a signal CP13.

A third 2-to-1 multiplexer 1036 selects from signals 1st, 2nd, 3rd, and 4th or signal T2 under the command of the aforementioned signal CP12. The output from multiplexer 1036 is inverted and buffered with inverter buffers 1038, whose outputs form clock pulses T2ST, T2ND, T2RD and T2TH. These pulses are used to select data in action control components 600, as described hereinabove with respect to FIG. 15.

A signal select circuit 1040 comprised of four NAND gates 1042 produces clock pulses AX, BX, CX, and DX from inputs of either signal CP13 or signals 1st, 2nd, 3rd or 4th.

The operation of the default memory multiplexers depicted in FIG. 13 is as follows. Signal WRITEX allows signals R31 through R38 to become active for only approximately 70 nanoseconds in a data load to a memory in sample component 1100. This is necessary because the table I/O pins provide the same bus for input and output data. During "load" time, flip-flop 1020 and its associated AND gate 1022 and delay 1026 generate the 70 nanosecond signal TRIST for activating tri-state buffers 1028 and 1030. Multiplexers 1032 and 1034 provide either the "run" addresses R31I through R38I to default table memory 900 (memory 902) or provide the loading addresses. The choice between "run" or "load" depends upon the state of signal CP13, which is produced from the control port of the display computer. Multiplexer 1036 passes one of two sets of clock pulses, which become clock pulses T2ST, T2ND, T2RD, and T2TH. These clock pulses load the data into the latches of action control components 600 in a sequential fashion. In the "run" mode, clock pulse T2 is selected by multiplexer 1036 and signals T2ST, T2ND, T2RD and T2TH are coincidental and follow signal T2 exactly in the inverted mode as a result of buffers 1038. Signal CP12 also inhibits signal TRIST in the load mode in order to prevent any loading of the memory of sample component 1100. Gates 1042 receive inputs 1st, 2nd, 3rd and 4th from mode control component 700. These sequential signals sequentially enable each of the four sections of the default table memory 902 when control signal CP12 is produced by the display computer during the load mode.

The circuitry in FIG. 14 operates as follows. As mentioned above, signal OORX represents unexpected conditions and this signal enters NOR gate 1004 and then becomes the input to both inverter 1006 and multiplexer 1008. The output of inverter 1006 controls the multiplexers 610, 612, 614 and 620 in FIG. 15 for choosing regular or default data. Inputs RO0 through RO7 are part of the current regular table memory 500 output and is called the "state check." This output is compared with the output of latch 630 by exclusive OR gates 1002. If equality exists, then NOR gate 1004, after NOR-RING all of the outputs from gates 1002, activates the signal SELECT of multiplexer 1008 and inverter 1006 produces a signal SELR that is "true." In this case, signals DB0 through DB7 are loaded through multiplexer 1008 into state latch 630 after clock time T2ST. Now the new state has been loaded in latch 630. If, however, signal 00RX has been produced, the byte consisting of signals RO8 through RO115 is chosen (which data originates from the default table) and is loaded into state latch 630 instead. In summary, the circuitry of FIG. 14 determines the selection of either regular or default memory data in "real time" during the operation of interpreter 50. Signals RO0 thourgh RO7 are "current state check" signals, the DB signals are default memory data, signals RO8 through RO15 are "new state" data, and signals R31I through R38I are the "current state" signals. Signal SELR/DEFX selects either regular or default memory data in multiplexers 620, 610, 612, and 614.

Sample collector and sample queue 1100 is depicted in FIGS. 16 and 17. A FIFO memory 1102 that is identical to memory 902 in FIG. 12 except that a full 10-bit address is required, that the outputs are always active since input OC is grounded, and that it is not divided up into four sections, accepts and generates a 64-bit word each time it is written into or when it is being read. The outputs are sent to DMA output control 1200. Data are received or generated on the "R" bus lines under control of signals WEX and the address lines, AD0 through AD9 are generated by DMA output control 1200.

The sample collector which stores information on the "R" lines is depicted in FIG. 17. Four 16-bit latches 1104, 1106, 1108, and 1110 receive the information from FIFO memory 1102. The outputs from latches 1104, 1106, 1108 and 1110 are made available to DMA output control 1200 in 16-bit words under the control of output control signals 0X through 4X, respectively when signal READX is active. The 64-bit word contains all the sensor input data, a time stamp from time stamp generator 800 (discussed hereinbelow), and control and state information that have been sampled through the "store" signal from external action latch 602.

Time stamp generator 800 is depicted in FIG. 11 and comprises a 32-bit binary counter 802 coupled with a 32-bit storage register 804. A 25-bit time stamp is generated from storage register 804 thus providing a 50 nanosecond minimum time division. A forty MHz oscillator 806 provides its output signal to counter 802 and to a transfer control circuit 808. Storage register 804 receives an output from transfer control circuit 808 together with signal TRIST as an enabling signal permitting the loading of the storage register information into FIFO RAM memory 1102. A signal WEX is provided to transfer control circuit 808 and holds the time stamp constant during the transfer time. Signal INITX' is used to set the value in counter 802 to zero at initialization, and thereafter the counter is under the control of oscillator 806.

The loading of regular table memory 500 and default table memory 900 is controlled by load control 700. As depicted in FIG. 10, data on lines DO0 through DO15 are generated by the display computer and are received in parallel by two 16-to-64 line multiplexers 702 and 704. The display computer also provides control signals DOS, CP8, CP1, and CP0 and signals CP7, CP6 and CP5 which are received by one 2-to-4 line decoder 706 and one 4 bit line decoder 708, respectively. Signal DOS is also received by two 4-bit strobes 710 and 712. A third set of data from the display computer is sent to a third 2-to-4 line en-decoder 714, the output of which is sent to strobe 712 and to multiplexer 702. Strobe 710 produces four output control signals RML0X through RML3X, which are the four "write" pulses for regular table memory 502. These "write" pulses activate the four sections of memory 502 so that only the particular addressed section is written to. Each time a write pulse and its associated address are generated for regular memory 502, signals RO0 through RO59 (i.e., a 60-bit word) are stored in memory 502. The input control signals CP5, CP6, and CP7, received by decoder 708, form a 60-bit word from the 16-bit input words. Signal DOS is used to strobe the output from strobe 710 and thus produce the RML signals. Strobing is used in order to allow for signal settling in the address input lines to regular table memory 502. Decoder 706 generates the store control signals for registers 206 and 208 (FIG. 5). Storage control signals DAX through DDX produced by strobe 712 are the four "write" for default table memory 902, and activate the four sections of memory 902. Each time a write pulse and its associated address are generated for memory 902, signals DB0 through DB51 (a 52-bit word) is stored in memory 902. Control signals CP9 through CP11, which are produced from the display computer control port, form a 52-bit word from the 16-bit input words through en-decoder 714 and multiplexer 702. Again, signal DOS is used to strobe the outputs from strobe 712 to decoder 714. Strobing is also used in order to allow for the signals to settle on the address input lines to default memory 902.

Figure 18:
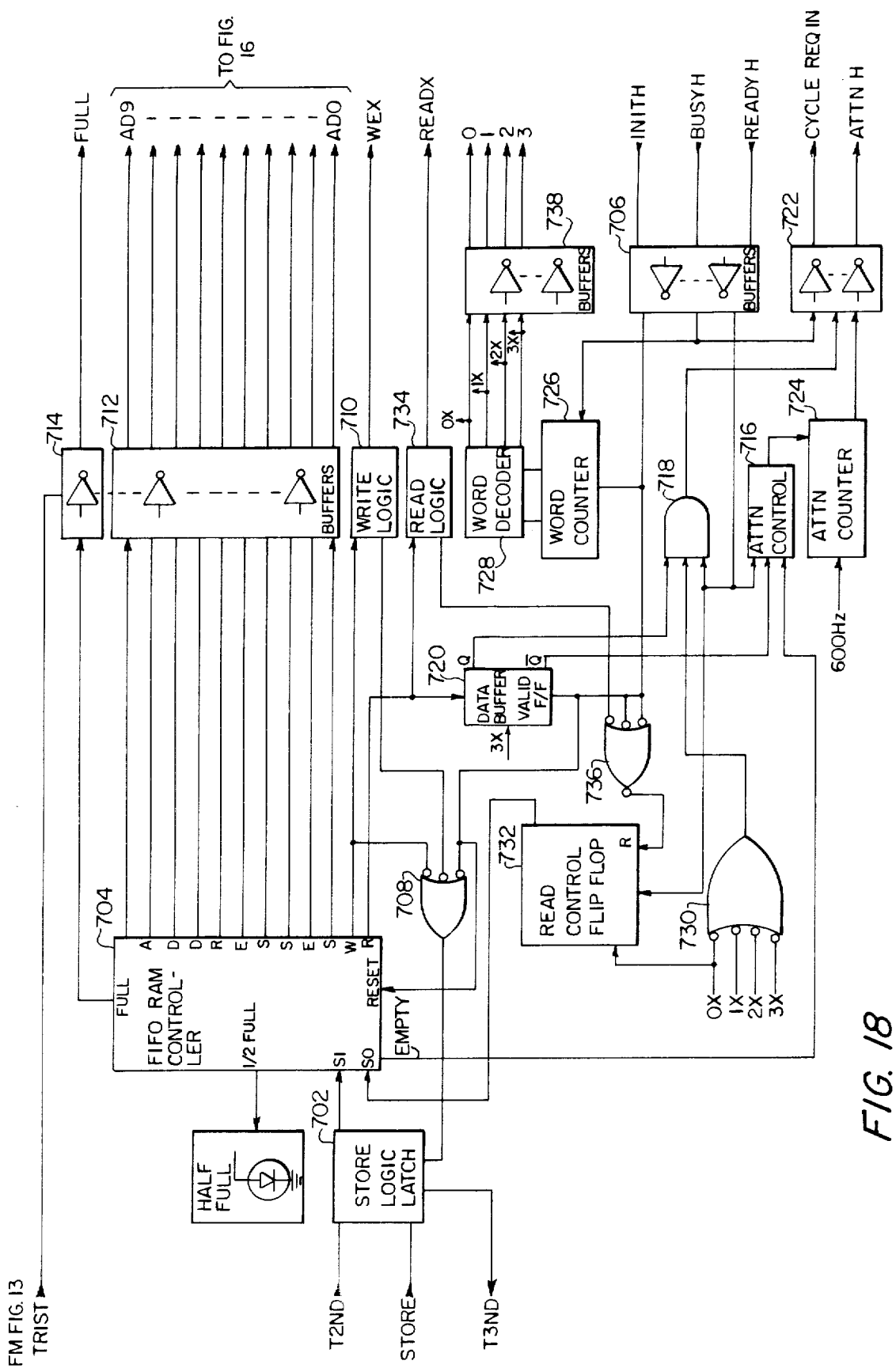
FIG. 18 is a more detailed, electrical schematic block diagram of the DMA output control component of the interpreter circuit depicted in FIG. 3.

DMA output control 1200 is shown in greater detail in FIG. 18. Signals are received from other components of interpreter 50 and are used to write into and read from FIFO memory 1102 (FIG. 16). Basically, these circuits control the DMA transfer of data from interpreter 50 to the display computer. A "store" logic latch 702 receives signal STORE which is clocked in by signal T2ND. Latch 702 produces an output signal to a FIFO RAM controller 704. Latch 702 also produces signal T3ND, which is used elsewhere in interpreter 50, as described hereinabove. Latch 702 is initially cleared by signal INITH which is transmitted to it through a buffer 706 and a negative OR gate 708. Upon the initiation of a signal from latch 702, controller 704 generates the FIFO RAM address and the RAM write signal, which after passing through a logic circuit 710 becomes signal WEX. The output from controller 704 is sent to the AD0 through AD9 lines via a tri-state buffer 712. Signal TRIST is used to enable buffer 712. The write signal from controller 704 is also sent to negative OR gate 708. Signal WEX is the immediate write control signal for the FIFO RAM, and arrives a little later than the address signals from controller 704. When signal WEX arrives at FIFO RAM 1102, the 64-bit data word (now activated at the I/O lines by signal TRIST) is written into its memory. In addition, signal TRIST enables a buffer 714 which is coupled to the "FULL" control status line of controller 704. When buffer 714 is enabled, the signal FULL is sent on the RAM I/O lines during the "write" pulse. Write logic 710 stretches the write signal from controller 704 to ensure the resetting of store logic latch 702. Controller 704 also produces an "empty" signal, which goes false as soon as a write cycle is sensed. When the write cycle is completed, a "read" signal from the RAM is attempted for a possible transfer of interpreter data via DMA to the display computer. A false "empty" signal removes signal ATTN H via an ATTN control 716 and allows a signal "CYCLE REQ IN" to be transmitted to the display computer as soon as the output from a logic AND gate 718 goes true. AND gate 718 is qualified by the Q output of a flip-flop 720. Flip-flop 720 produces a positive Q output when it is preset by the read pulse generated by controller 704. In addition, AND gate 718 is enabled by a signal "READY H" sent through buffer 706. Signal ATTN H and another signal "CYCLE REQ IN" are buffered by an output buffer 722. This latter signal is the received signal "BUSY H" that has been reinverted by buffer 722, the signal having been initially inverted by buffer 706.

An ATTN counter 724 receives and is toggled by a 600 HZ signal from time stamp generator 800. The output signal of counter 724 is labelled signal ATTN H. Counter 724 is held in the "false empty" state (or FE) or by the signal READY H through buffer 706. In this way, signal ATTN H is held off so long as either signal FE or signal READY H are present. As long as signal ATTN H is held off and signal READY H is present, interpreter 50 attempts to transmit data to the display computer. Signal CYCLE REQ IN gives rise to the display computer signal BUSY H. This latter signal, received through buffer 706, performs two functions. First it steps a word counter 726 from the OX state to the 1X state. Secondly, signal BUSY H primes buffers 722 for another signal "CYCLE REQ IN." The parallel output of word counter 726 is received by a word decoder 728. Decoder 728 detects the signal 1X and causes a transition on a multi-input negative OR gate 730. The transition on gate 730 in turn produces a transition signal to AND gate 718. Gate 718, as mentioned above, now provides the final qualifications for buffer 722, thereby generating another signal "CYCLE REQ IN."

A signal READY H, received by buffer 706 toggles a recontrol flip-flop 732. An output from flip-flop 732 qualifies signal SO of controller 704 and produces a read cycle, unless another write cycle is already in progress. The default is "full" at which time a read cycle is forced at the loss of a possible next write request. At other times, requests are honored at a first-come-first-served basis. Signal SO removes the false empty status only if one write function has been performed. Otherwise, the false empty remains until the number of read cycles equals the number of write cycles.

The read output of controller 704 causes two actions. First, it gives rise to signal READX. The generation of signal READX loads the 64-bit DMA buffer with the FIFO RAM word. Secondly, it removes signal SO from controller 704 after delaying the read pulse from controller 704 through a read logic 734, then sending its output to a negative NOR gate 736, which in turn resets recontrol flip-flop 732. Flip-flop 732, in turn, removes the signal to controller input SO.

In the meantime, data buffer valid flip-flop 720 has qualified gate 718, which causes a transition of signal "CYCLE REQ IN." This, in turn, causes signal BUSY H to be applied by the display computer. The first signal BUSY H places the signal OX 16-bit word into the display computer buffer. Word decoder 728 now sits on an output signal 1X, causing another CYCLE REQ IN, causing another signal BUSY H, and causing the second 16-bit word transfer. This action continues until signal 3X, produced by word decoder 728, is removed. At that time, flip-flop 720 is toggled and blocks any further signals CYCLE REQ IN. The action then repeats after detection, and in due course, after another write cycle has been completed. A buffer 738 provides signals 0, 1, 2, and 3 for use elsewhere in interpreter 50 if future expansion is desired.

Figure 19:
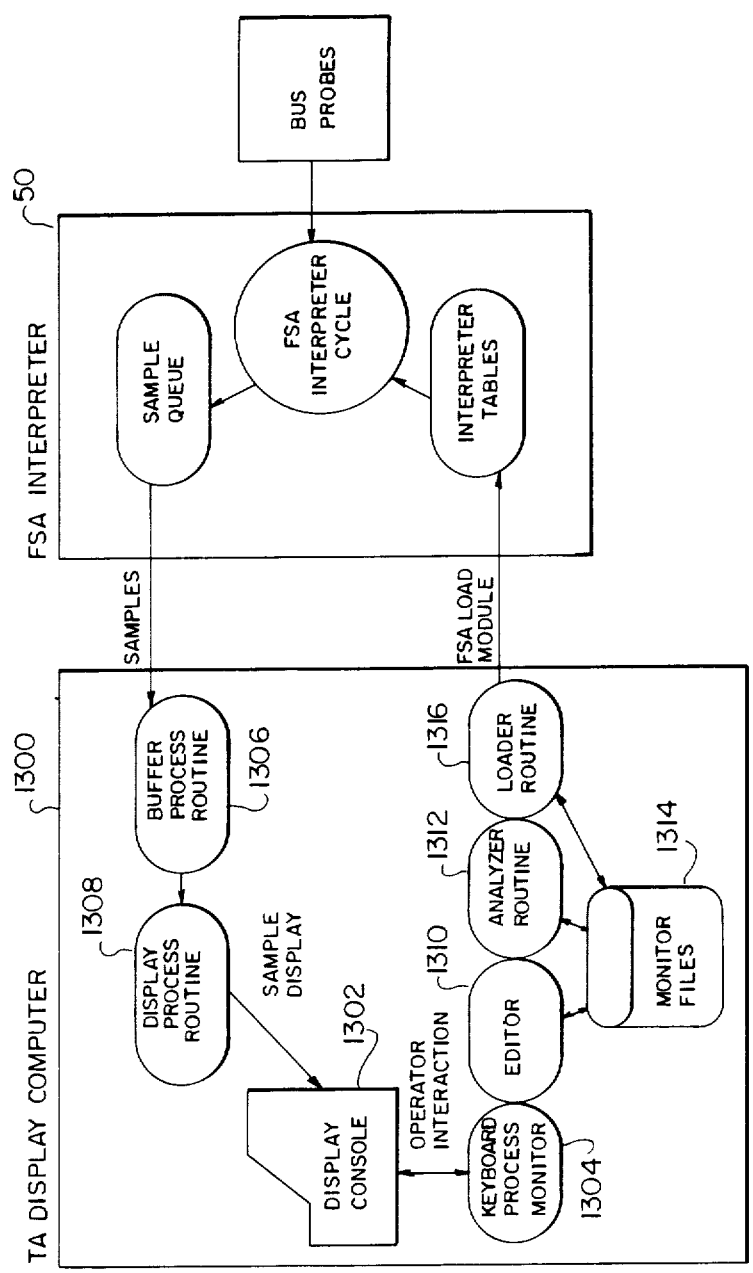
FIG. 19 is a schematic block diagram of the system architecture of the present invention used in combination with a display computer.

An interconnection of interpreter 50 to a display computer indicated at 1300 is depicted in FIG. 19. In general, an electronic system is connected to the 32 inputs of interpreter 50 for verification of a particular electronic transaction. After hookup, these sytems are turned on and an electronic system is placed in operation. Interpreter 50 is loaded with a set of programs that provide it and display computer 1300 with the knowledge of the electronic system operations. In time, display computer 1300 will display analyzed results about the verification, while at the same time indicating unexpected conditions that occur in the electronic system operation if such are found.

As mentioned above, interpreter 50 is designed to operate with display computer 1300. Interpreter 50 is the fast hardware designed to interpret the finite state automata loaded into its memory as described above. Display computer 1300 comprises a standard microcomputer under the control of a conventional software operating system and having additional software for controlling interpreter 50 and receiving the resulting samples. Display computer 1300 sends control information to interpreter 50, including data to be stored in regular memory 500 and default memory 900. Interpreter 50, in turn, sends samples selected from the input stream under the control of the finite state automata back to display computer 1300.

Display computer 1300 in a preferred embodiment is a PDP-11 computer with 256K main memory, a console display 1302, two diskette drives, 48 parallel output lines for controlling interpreter 50, and a direct memory access (DMA) interface for receiving samples. The preferred operating system is a single-user version of "UNIX". The software associated with display computer 1300 is shown graphically in FIG. 19. This software comprises a keyboard process monitor 1304 which monitors the console keyboard and executes operator commands, a buffer process routine 1306 which acts as a host for the DMA interface and which buffers samples in the main memory of display computer 1300, and a display process routine 1308 which formats samples and displays them on the console of microcomputer 1302. Monitor 1304, buffer process routine 1306, and display process routine 1308 represent the software which is used for communicating between display computer 1300 and the outside environment.

Keyboard process monitor 1304 can be temporarily replaced by other programs when necessary to execute an operator command. These programs include an editor 1310 which allows modification to a monitor file and which includes an FSA specification; an analyzer routine 1312 which processes a monitor file to prepare an FSA load module; and a loader routine which sends the prepared load module to interpreter 50 using the control output device of display computer 1300.

Keyboard process monitor 1304 initiates the other processes and then monitors the console keyboard of display computer 1300. Monitor 1304 intercepts operator commands from the keyboard and executes them by performing simple commands itself, passing the commands to the buffer routine 1306 or display routine 1308, or by invoking one of the "overlay" programs. Various commands allow the operator to select, edit, analyze, and load monitor files, to start and stop the interpreter, to vary the display format, and to generally accomplish the conventional operations of a keyboard monitor.

Buffer routine 1306 devotes most of the memory of display computer 1300 which it takes over to a large software buffer for samples. The routine turns this buffer file over to the DMA device driver, which continuously posts DMA reads from sample collector and queue component 1100 into this software buffer. Whenever the display process requests a sample, the buffer process returns the oldest available sample. If the buffer fills up, the oldest samples are discarded and the overflow is marked.

Display process routine 1308 reads samples from the buffer memory and displays them on the display of display computer 1300, saves them on a diskette of display computer 1300, summarizes them statistically, or otherwise translates the samples into useful information. The display format can be modified during monitoring by commands which are forwarded by keyboard monitor 1304.

Editor 1310 allows the operation to interactively view and modify most parts of a complex data structure representing a monitor, including the FSA specification and suitable display commands. The FSA is specified as a number of states, with a default transition and possibly several regular transitions for each state.

Analyzer routine 1312 reads a monitor file 1314 prepared with editor 1310, verifies the validity of the FSA specification, chooses hash keys and other necessary data, prepares a load module for the interpreter tables, and appends the prepared load module to monitor files 1314.

A loader routine 1316 reads a monitor file 1314 with a load module and calls on the control device to transfer the information into memories 500 or 900 of interpreter 50.

In operation, interpreter 50 is initially prepared by display computer 1300 as described above and then operates independently until the information is to be analyzed by the operator or other use of it made through display computer 1300.

Each cell of both regular memory 500 and default memory 900 includes a new hash key, along with the new state and external action. In this way, the new hash key is immediately available for the next cycle. Nevertheless, the hash key is the same for all transitions that lead to a particular state. Regular memory 500 also contains a state check field. With interpreter 50 in a particular state, and the corresponding hash key available, the next input that occurs is converted to a hash address. The hash function used is the 2's complement addition of the hash key and the input, and the hash function produces a hash address and an out-of-range signal. When the addressed cell of regular memory 502 is produced, there are several possibilities.

Firstly, the hash address may point to a regular action of the current state, in which case the state check field of the cell will agree with the current state. Alternatively, the hash address may point to a regular action of some other state, or to a cell that is not used by any state. On the other hand, if the out-of-range signal is true, this indicates that no regular action exists for the hashed address input.

In the first case, the regular action is valid and is selected. In all other cases, no regular action exists for this state and the input and the default action for the state is selected. In all cases, regular memory 500 and default memory 900 are both read so that either action is immediately available for selection.

The system must deal with a large set of input characters because it is designed to monitor a parallel bus. The monitored bus has 15 tag lines and 16 data lines, but some simple procedures can be used to ignore most of the data lines. Even with such procedures, a 20-bit pattern is used as an input character. For the present embodiment, a maximum of 256 states of an 8-bit state field is required. An action is represented by a 16-bit field. The hash key contains 20 bits, the size of the bits, the size of the input character, plus 8 bits to selectively mask some of the input so as to reduce the number of "don't-care" bits in the input character.

The entries in the regular transition table contain: a new state of 8 bits; a new hash key of 28 bits; an action of 16 bits; and a state check of 8 bits. The number of entries in the regular table, reduced by a load factor as is conventional for all hashing methods, determines the maximum number of regular transitions allowed in an FSA. The present invention can use a table of 1024 entries which requires a 10-bit hashed address. Such a table appears to be sufficient for most uses of the present invention.

The data stored in default table memory 900 does not contain a state check field, but it does have one entry for each state. Each entry is 52 bits long and there are a total of 256 entries in the preferred embodiment, and thus only an 8 bit address is required.

Under the aforedescribed conditions, a straightforward implementation would require a table of 24-bit entries for the new state and action and a 28-bit address for the state and input character. This would result in a table size of nearly 2 billion bytes ($2^{28} \times 24$ bits). On the other hand, the present invention requires less than 10,000 bytes in its table ($52 \times 256 + 60 \times 1024$ bits). This significant reduction in space requirements, however, is not achieved at the expense of speed because of the present invention.

The basic interpreter cycle ocurs in three phases. At time T0, the transition detector has detected a change on one or more of the bus lines, the bus line values have stabilized, and the Transaction Analysis cycle can begin. The bus lines are sampled immediately for possible use later if the FSA requests a sample. Bus trap 200 checks for selected values on the data lines and reports its result in four bits. These four bits, plus the tag lines from the bus provided by transition detector 300 and the stored hash key constitute the input to hash coder 400.

In hash coder 400, some of the input data from the tag lines is masked out and part of the hash key is subtracted from the masked input by using a 2's complement addition. The output of hash coder 400 is a 10-bit hashed address which is received by regular memory 500. With such a function, any particular input character can be mapped to any hash address, and this simplifies the task of interpreter 50. Other hashing functions with similar properties can be used.

At time T1, the hashed address is ready. A read cycle for regular memory 500 now begins. Simultaneously, a read cycle for default memory 900 begins. The address used in default memory 900 is the state, which was already stable at time T0. After the memory reads are complete, memory selector 1000 can select a transition. If the state check from regular memory 500 matches the current state, and the hash coder 400 does not indicate an out-of-range condition, the output from regular memory 500 is selected by memory selector 1000. Otherwise, memory selector 1000 selects the output from default memory 900.

At time T2, a transition has been selected and latched in action control 600. This determines new values for the state, the hash key, and the external action. At this point, the next cycle may begin with a new time T0 because the critical portion of the cycle is complete. However, the external actions are still not complete.

One important external action is the sample action which stores a sample constructed from the latched bus input, the state, and a time-stamp in sample component 1100. When a cycle occurs without a sample action, the sample is discarded.

The analyzer begins with an FSA specification with a number of states. Each state includes a default transition and zero, one, or several regular transitions. Hash keys must be chosen for each state to map that state's regular transitions into the physical range of regular memory 500 without colliding with the mapped transitions of any other state. The regular transitions for a state must be mapped together, since each state has only one hash key.

The problem of shuffling the hash keys for all states to eliminate conflicts in an optimal fashion is complex, but under present circumstances is also unnecessary. Instead, a complexity value can be determined for each state and the states can be sorted in the descending order of complexity. The complexity value includes the width of the state's transitions which is the largest input character for a regular transition minus the smallest input character. In addition, the complexity value includes the number of regular transitions for the state.

Then a hash key is chosen for each state, one at a time in this order, with no backtracking to change the hash keys that have already been chosen. The regular transitions for a state are attempted to be placed near the center of the physical memory. If that choice causes conflicts with previously placed transitions from other states, then consecutive locations on both sides of the center are tried until the placement is successful or the size of the physical memory is exceeded.

Sometimes, there are limitations in a particular embodiment of the present invention. For example, the FSA may have too many regular transitions so that the analysis cannot succeed. In this case, either the size of regular memory 500 must be expanded or the FSA must be redesigned to be smaller. This case usually does not arise in practice, however, because the preferred memories are large enough.

Another problem may be that a state is too wide, and that the hashed values for two of its regular transitions cannot fit in the physical memory for any hash key. This case is also unlikely, but if it does happen the state can be split easily into two smaller states that achieve the same effect and that can be mapped.

A third limitation can exist if a suitable location cannot be found for one of the states. In this situation, a larger memory or a smaller FSA is required. Because the algorithm is not optimal, it is possible that a solution to the puzzle exists but the algorithm did not find it. But such cases again are rare and usually occur near the physical limits of regular memory 500.

The present invention has been described with respect to specific circuits for a specific design. In a prototype, these circuits are on 12 circuit boards, as mentioned above. The major boards include one for the transition detector to passively probe the bus lines, detect changes, and control the subsequent interpreter cycle. Another board is used for the bus trap 200 to selectively trap certain data values and thereby reduce the number of bits in the input character from a design of 31 to 20. A board is used for hash coder 400 and combines the control or tag lines and trapped data with the hash key, thereby producing a hashed address to regular memory 500. Regular memory 500 and default memory 900 are on the same board and a further board contains memory selector 1000 for choosing between them. A FIFO memory is on another card and holds the samples. The remaining parts of sample component 1100 are on another board and are for adding samples under system control, for receiving a high-resolution time stamp from a time stamp generator 800 located on a separate board, and for deleting samples as they are passed to a DMA output control 1200 located on yet another board.

A specific example of the operation of the present invention is set forth below with respect to transactions occurring on an interface bus pursuant to the timing diagram depicted in FIG. 20. While the specific example demonstrates the versatility, flexibility and the advantages of the present invention, it is understood that the present invention is not to be construed as to be limited to the types of transactions presented in this example.

Figure 20:
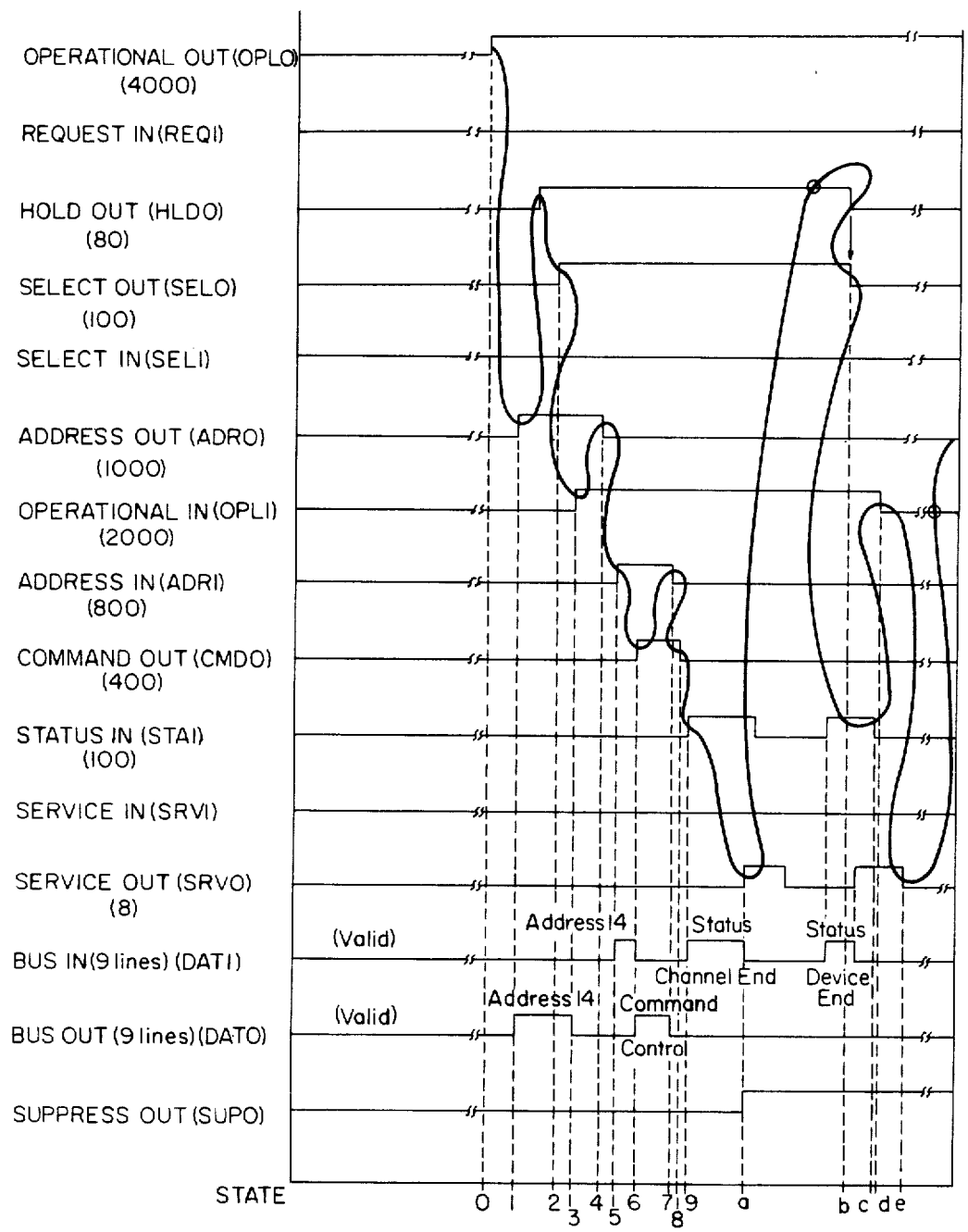
FIG. 20 is a timing diagram of control and data signals appearing on an interface bus between a computer CPU and a disk subsystem, which signals comprise transactions that can be monitored by the present invention.

The signals depicted in the timing diagram in FIG. 20 were generated on an interface bus between a channel simulator (not shown) and a Control Data Corporation (CDC) Model 3350 disc subsystem (also not shown). The channel simulator is a computer constructed to generate and simulate the control signals generated by a typical operational computer in communication with an off-line memory device. The CDC 3350 disc subsystem is a conventional, commercially available fast disc memory device comprising a disc controller and a disc drive. The channel simulator and the disc subsystem were connected and operated according to the published specifications of FIPS 60 to 63, incorporated herein by reference.

The channel simulator was instructed to enter no operation commands (NOP commands), which required interaction between the channel simulator and the disc controller to perform the initial sequence, the sending of the NOP command to the controller, and the final sequence. The timing diagram depicted in FIG. 20 illustrates this transaction. Further details of the operation and the signal definitions are provided in the aforementioned FIPS 60 to 63 specifications. However, for the purpose of this example, the important control lines for this transaction are the operational out line, the hold out line, the select out line, the address out line, the operational in line, the address in line, the command out line, the status in line, and the service out line. Obviously, other control signals are used in other commands, but are not described in the present example.

Passive probes connect the interface bus and provide the data and control signals to the level shifters 102 and 104 of sensor input 100 of interpreter 50. Each control signal was assigned a bit location, so that any instantaneous configuration is expressable as a binary number. This number forms the input word to interpreter 50. The input words corresponding to the above listed control signals for this example, in hexadecimal notation, are listed in Table I below:

TABLE I

| Control Line | | Input Word |
|---|---|---|
| operational out | (OPLO) | 4000 |
| hold out | (HLDO) | 80 |
| select out | (SELO) | 100 |
| address out | (ADRO) | 1000 |
| operational in | (OPLI) | 2000 |
| address in | (ADRI) | 800 |
| command out | (CMDO) | 400 |
| status in | (STAI) | 100 |
| status out | (STAO) | 10 |
| service out | (SRVO) | 8 |

For the present example using the NOP transaction, the correct sequence of input words can be described with fifteen states. These states are listed in Table II below:

TABLE II

| State | Description | Expected Input Word | Comments |
|---|---|---|---|
| 0 | await quiescent state between transactions | 4000 | operational out high, all others low |
| 1 | await address out | 5000 | add address out high |
| 2 | await out & select out | 5180 | the two lines may be raised in either order or simultaneously |
| 3 | await operational in (high) | 7180 | |
| 4 | await address out (low) | 6180 | |
| 5 | await address in (high) | 6980 | |
| 6 | await command out (high) | 6d80 | |
| 7 | await address in (low) | 6580 | |
| 8 | await command out (low) | 6180 | |
| 9 | await status in (high) | 6190 | |
| a | await service out (high) | 6198 | |
| b | await hold and select out (low) | 6018 | signals always simultaneous |
| c | await status in (low) | 6008 | |
| d | await operational in (low) | 4008 | |
| e | await service out (low) | 4000 | return to state 1 |

It is noted that when two signals or more are present simultaneously, that the expected input word is the summation of them. For example, in state 2, the expected hold out signal is input word "80" asnd the expected input word for the select out operation is 100. The 5000 added to the input word is derived from the 4000 input word from state 0 which indicates the word for the operational out and the input word for the address out signal which is the number "1000". This can also be seen in FIG. 20, where at state 2, all signals are "low", except that the following control signals are "high": Address Out, Select Out, Hold Out and "Operational Out". The bit positions for each of the 15 signals in FIG. 20 are shown in Table III, located at the end of the specification. The high order bit (MSD) is signal OPLO (Operational Out) and the low order bit (LSD) is signal SUPO (Suppress Out).

If the transaction being monitored occurs exactly in the above sequence, then interpreter 50 proceeds through the states in numerical order and then returns to state 1 to await the next transaction. If any exceptions occur, interpreter 50 goes immediately to state 0 and then waits again for the quiescent state between transactions.

Using an editor program, such as editor 1310 depicted in FIG. 19, a test description can be prepared for the expected transactions. The description includes a finite state automaton represented as states and transitions. Editor 1310 produces a finite state automaton file containing the test description in a form suitable for use by editor 1310 and an analyzer routine, such as analyzer routine 1312. The file is produced as a result of the expected transitions that have been identified by the operator. A conventional state transition diagram, as is well known in the art, can also be produced, but for this example is not deemed to be necessary. During interactive use of the editor, selected parts of the test description are normally displayed on the monitor of display console 1302 (FIG. 19). A sample of such a display is depicted in Table III, located at the end of the specification. The finite state automaton file is depicted in Table IV also located at the end of the specification. Twenty bit positions are depicted, but in this example, only fifteen are used. A "+" in a bit position means a "high" state ordinary "1" and a "−" in a bit position means a "low" state or a binary "0". The five bit positions following the number of the next state (i.e., the GOTO signal) represent the status of external action states and for all states of this example indicate that the received data is a sample, and not a "halt" signal, an "Again" signal, or a "trigger '0'" or "trigger '1'" signal, respectively (see also Table III).

The output of editor 1310 is read by analyzer routine 1312, which then determines the hash keys and constructs a load module. It produces an optional listing of its selections of hash keys according to the algorithm described hereinabove. An example of this listing is reproduced in Table V.

The listing in Table V shows the input word corresponding to each regular transition (e.g. 7180 for state 3) and the hash key chosen for that state (e.g. xF91 7F for state 3). The regular table address for any transition, is the 2's complement sum of the transition input word and the state hash key. An example of the regular table address for state 3 in hexadecimal is x02FF derived from the two's complement addition of 07180 and F917F. It is noted, however, that the listing in Table III is normally not used except under special circumstances, and then normally by operators that are very familiar with the application.

The analyzer also produces a load module that contains a compact representation of both default Table 900 and regular Table 500. The load module is used by loader routine 1316 to initialize the table memories of interpreter 50. An example of the load module for the present example, is depicted in Table VI, located at the end of the specification. This listing is also only useful to the operator in special cases, and is normally only "seen" by loader routine 1316. The default table and the regular table are shown in Tables VII and VIII, respectively, in a form more readable to the operator.

For the present example, various internal formats and representations are shown. However, for ordinary use, the operator uses only the programs and ignores the internal details. Thus, editor 1310, analyzer routine 1312, and loader routine 1316 normally suppress this high level of detail and allow the operator to make changes at a more abstract level. Except for the selection of the hash keys, described hereinabove, the techniques used in these programs comprise algorithms and routines that are well known to those skilled in the art.

A number of different FSA's can be defined, with various triggering and sampling characteristics using the teachings of the present invention. When an appropriate FSA is loaded, the present invention assumes those characteristics for subsequent monitoring. As a result, the task of diagnosing problems in bus interactions can be decomposed into a battery of specialized monitors for specific purposes. Furthermore, a particular FSA can be modified by the operator using the display computer 1300 during monitoring in order to probe deeper into any one of the results. In addition, the FSA's can be easily modified during the development of the monitor battery.

The present invention has been described with respect to a preferred embodiment thereof. However, it should be apparent to those of ordinary skill in the art that other variations and changes can be made. Clearly, the present invention can be used for monitoring the high speed bus interactions. Because of the architecture of the present invention, it is relatively easy to design precise and flexible monitor variations. Similarly, the present invention can be used in other situations.

TABLE III
EDITOR PROGRAM DISPLAY ELse,
State, Header, list, TErse, Verbose, Quit,
TItle=[ string ! word ], DIsplay, INTrap, Outrap State* markl NOP test INPUT    TRAPS A:  OxO B: OxO C: OxO
OUTPUT   TRAPS A:  OxO B: OxO C: OxO
DISPLAY COMMANDS:
:
Name= word, Previous, ELse, ACtion, DElete, State, Header, List, TErse, Verbose, Quit,
TItle=[ string ! word ], DIsplay, INTrap, Outrap State    Name
1: andro__hi
Action       Tagline       Pattern                  Goto           External
  1:       +----+----------### #               2         +----
else:                                                         1         ----

:
INPut= tagline value *, pattern ,
Goto=[ state nbr! SELF! NEXT! state name ],
EXternal= ext action value *, Follow, action nbr, Name= word , Previous, Else, ACtion,
DElete,
State, Header, List, TErse, Verbose, Quit,
TItle=[ string ! word ], DIsplay, INTrap, Outrap State* 1 Name: andro__hi Action: 1

```
                                                              S       A   T   T
O  R  H  S  S  A  O  A  C  S  S  S  D  D  S      D   D   G   A   H   G   R   R
P  E  L  E  E  D  P  D  M  T  R  R  A  A  U      T   T   O   M   A   A   I   I
L  Q  D  L  L  R  L  R  D  A  V  V  T  T  P      R   R   T   P   L   I   G   G
O  I  O  O  I  O  I  I  O  I  I  O  I  O  O      I   O   O   L   T   N   I   I
+  -  -  -  -  +  -  -  -  -  -  -  -  -  #      #   #   2   +   -   -   -   -
```

TABLE IV
EDITOR PROGRAM OUTPUT FILE

STATE 0, oplo__hi
A ###################,0, -----
A +--------------#####,1, +----

STATE 1, adro__hi
A ###################,1, -----
A +----+----------#####,2, +----

STATE 2, hldo__selo
A ###################,0, -----
A +-++-+---------#####,3, +----

TABLE IV-continued
EDITOR PROGRAM OUTPUT FILE

A +-+--+---------#####,2, -----
A +--+-+---------#####,2, -----

STATE 3, opli__hi
A ###################,0, -----
A +-++-++--------#####,4, +----

STATE 4, adro__lo
A ###################,0, -----
A +-++--+--------#####,5, +----

STATE 5, adri__hi
A ###################,0, -----
A +-++--++-------#####,6, +----

STATE 6, cmdo__hi
A ###################,0, -----
A +-++--+++------#####,7, +----

STATE 7, adri__lo
A ###################,0, -----
A +-++--+-+------#####,8, +----

STATE 8, cmdo__lo
A ###################,0, -----
A +-++--+--------#####,9, +----

STATE 9, stai__hi
A ###################,0, -----
A +-++--+--------#####,10, +----

STATE 10, srvo__hi
A ###################,0, -----
A +-++--+--+--+--#####,11, +----

STATE 11, hdsl__lo
A ###################,0, -----
A +-----+--+--+---#####,12, +----

STATE 12, stai__lo
A ###################,0, -----
A +-----+----+---#####,13, +----

STATE 13, opli__lo

TABLE IV-continued
EDITOR PROGRAM OUTPUT FILE

```
A  ################,0, -----
A  +----------+---####,14,+----
```

TABLE IV-continued
EDITOR PROGRAM OUTPUT FILE

```
STATE 14, srvo_lo
A  #################,0, -----
A  +--------------####,1, +----
```

TABLE V
ANALYZER PROGRAM OUTPUT LISTING

```
name
title mark1 NOP test
display commands:

compiled          YES
data traps in     xO xO xO
data traps out    xO xO xO
State    O  Name=oplo_hi
Action   TagLine       Pattern              GoTO   ExtAct   Input    RegAddr
1:       +------------###                   1      +----    x04000   x02FD
else:                                       0      -----
mask:    ----------------**
hask key=xFC2 FD nbr of actions=1                  address width=xO
State    1  Name=adro_hi
Action   Tagline       Pattern              GoTO   ExtAct   Input    RegAddr
1:       +-- -+--------###                  2      +----    x05000   x0301
else:                                       1      -----
mask:    ----------------**
hask key=xFB3 1 nbr of actions=1                   address width=0
State    2  Name=hldo_selo
Action   Tagline       Pattern              GoTO   ExtAct   Input    RegAddr
1:       +- ++- +--------###                3      +----    x05180   x0280
2:       +- +-- +--------###                2      -----    x05080   x0180
3:       +- - +- +--------###               2      -----    x05100   x0200
else:                                       0      -----
mask:    ----------------**
hask key=xFB1 0 nbr of actions=3                   address width=x100
State    3  Name=opli_hi
Action   Tagline       Pattern              GoTO   ExtAct   Input    RegAddr
1:       +- ++- ++--------###               4      +----    x07180   x02FF
else:                                       0      -----
mask:    ----------------**
hash key=xF91 7F nbr of actions=1                  address width=xO
State    4  Name=adro_lo
Action   Tagline       Pattern              GoTO   ExtAct   Input    RegAddr
1:       +- ++-- +--------###               5      +----    x06180   x0302
else:                                       0      -----
mask:    ----------------**
hash key=xFA1 82 nbr of actions=1                  address width=xO
State    5  Name=adri_hi
Action   Tagline       Pattern              GoTO   ExtAct   Input    RegAddr
1:       +- ++-- ++--------###              6      +----    x06980   x02FE
else:                                       0      -----
mask:    ----------------**
hask key=xF99 7E nbr of actions=1                  address width=xO
State    6  Name=cmdo_hi
Action   Tagline       Pattern              GoTO   ExtAct   Input    RegAddr
1:       +- ++- -++-------###               7      +----    x06D80   x0303
else:                                       0      -----
mask:    ----------------**
hask key=xF95 83 nbr of actions=1                  address width=xO
State    7  Name=adri_lo
Action   Tagline       Pattern              GoTO   ExtAct   Input    RegAddr
1:       +- ++-- +- +--------###            8      +----    x06580   x0304
else:                                       0      -----
mask:    ----------------**
hash key=xF9D 84 nbr of actions=1                  address width=xO
State    8  Name=cmdo_lo
Action   Tagline       Pattern              GoTO   ExtAct   Input    RegAddr
1:       +- ++-- +---------###              9      +----    x06180   x0305
else:                                       0      -----
mask:    ----------------**
hash key=xFA1 85 nbr of actions=1                  address width=xO
State    9  Name=stai_hi
Action   Tagline       Pattern              GoTO   ExtAct   Input    RegAddr
1:       +- ++-- +-- +--------###           10     +----    x06190   x02FB
else:                                       0      -----
mask:    ----------------**
hash key=xFA1 6B nbr of actions=1                  address width=xO
State    10 Name=srvo_hi
Action   Tagline       Pattern              GoTO   ExtAct   Input    RegAddr
1:       +- ++-- +- +- +---###              11     +----    x06198   x0306
```

TABLE V-continued
ANALYZER PROGRAM OUTPUT LISTING

```
else:                                    0  - - - - -
mask:   - - - - - - - - - - - - - - - - - * *
hash key=xFA1 6E nbr of actions=1                    address width=x0
State    11  Name=hdsl_lo
Action   Tagline      Pattern              GoTO  ExtAct      Input    RegAddr
1:       +- - - - - +- - +- +- - - # # #   12    +- - - -    x06018   x02FA
else:                                    0  - - - - -
mask:   - - - - - - - - - - - - - - - - - * *
hash key=xFA2 E2 nbr of actions=1                    address width=x0
State    12  Name=stai_lo
Action   Tagline      Pattern              GoTO  ExtAct      Input    RegAddr
1:       +- - - - - +- - - - +- - - # # #  13    +- - - -    x06008   x0307
else:                                    0  - - - - -
mask:   - - - - - - - - - - - - - - - - - * *
hash key=xFA2 FF nbr of actions=1                    address width=x0
State    13  Name=opli_lo
Action   Tagline      Pattern              GoTO  ExtAct      Input    RegAddr
1:       +- - - - - - - - - - +- - - # # #  14    +- - - -    x04008   x02F9
else:                                    0  - - - - -
mask:   - - - - - - - - - - - - - - - - - * *
hash key=xFC2 F1 nbr of actions=1                    address width=x0
State    14  Name=srvo_lo
Action   Tagline      Pattern              GoTO  ExtAct      Input    RegAddr
1:       +- - - - - - - - - - - - - - # # #  1    +- - - -    x04000   x02FC
else:                                    0  - - - - -
mask:   - - - - - - - - - - - - - - - - - * *
hash key=xFC2 FC nbr of actions=1                    address width=xO
```

TABLE VI
LOAD MODULE LISTING

```
        END STATE              [Tables are cleared with
        END FSM 0               these sets of values
        FSM LOAD MODULE 0
        DEFCLR  0 0 0 0 0
        REGCLR  0 0 0 0 0  ff
        TRAP    0 0 0 0 0 0
D  0000  0000  0000  00fc  00fd  0fc2
D  0001  0001  0000  00fc  0001  0fb3
D  0002  0000  0000  00fc  00fd  0fc2
D  0003  0000  0000  00fc  00fd  0fc2
D  0004  0000  0000  00fc  00fd  0fc2
D  0005  0000  0000  00fc  00fd  0fc2
D  0006  0000  0000  00fc  00fd  0fc2
D  0007  0000  0000  00fc  00fd  0fc2   DE-
D  0008  0000  0000  00fc  00fd  0fc2   FAULT
D  0009  0000  0000  00fc  00fd  0fc2   TABLE
D  000a  0000  0000  00fc  00fd  0fc2
D  000b  0000  0000  00fc  00fd  0fc2
D  000c  0000  0000  00fc  00fd  0fc2
D  000d  0000  0000  00fc  00fd  0fc2
D  000e  0000  0000  00fc  00fd  0fc2
R  0180  0002  0000  00fc  0000  0fb1  0002
R  0200  0002  0000  00fc  0000  0fb1  0002
R  0280  0003  0001  00fc  007f  0f91  0002
R  02f9  000e  0001  00fc  00fc  0fc2  000d
R  02fa  000c  0001  00fc  00ff  0fa2  000b
R  02fb  000a  0001  00fc  006e  0fa1  0009
R  02fc  0001  0001  00fc  0001  0fb3  000e
R  02fd  0001  0001  00fc  0001  0fb3  0000  REGULAR
R  02fe  0006  0001  00fc  0083  0f95  0005   TABLE
R  02ff  0004  0001  00fc  0082  0fa1  0003
R  0301  0002  0001  00fc  0000  0fb1  0001
R  0302  0005  0001  00fc  007e  0f99  0004
R  0303  0007  0001  00fc  0084  0f9d  0006
R  0304  0008  0001  00fc  0085  0fa1  0007
R  0305  0009  0001  00fc  006b  0fa1  0008
R  0306  000b  0001  00fc  00e2  0fa2  000a
R  0307  000d  0001  00fc  00f1  0fc2  000c
LATCH  0000  0000  00fc  00fd  0fc2
END LOAD MODULE  0000
```

TABLE VII
DEFAULT TABLE CONTENTS

| state (def. tbl address) | new state | external action | hash gate | hash key |
|---|---|---|---|---|
| 00 | 00 | 000 | fc | fc2fd |
| 01 | 01 | 000 | fc | fb301 |
| 02 | 00 | 000 | fc | fc2fd |
| 03 | 00 | 000 | fc | fc2fd |
| 04 | 00 | 000 | fc | fc2fd |
| 05 | 00 | 000 | fc | fc2fd |
| 06 | 00 | 000 | fc | fc2fd |
| 07 | 00 | 000 | fc | fc2fd |
| 08 | 00 | 000 | fc | fc2fd |
| 09 | 00 | 000 | fc | fc2fd |
| 0a | 00 | 000 | fc | fc2fd |
| 0b | 00 | 000 | fc | fc2fd |
| 0c | 00 | 000 | fc | fc2fd |
| 0d | 00 | 000 | fc | fc2fd |
| 0e | 00 | 000 | fc | fc2fd |
| all others (0f to ff) not used | 00 | 000 | 00 | 00000 |

Note: all numbers are in hexadecimal notation.

TABLE VIII
REGULAR TABLE CONTENTS

| reg. tbl address | new state | external action | hash gate | hash key | state check |
|---|---|---|---|---|---|
| 02fd | 01 | 001 | fc | fb301 | 00 |
| 0301 | 02 | 001 | fc | fb100 | 01 |
| 0180 | 02 | 000 | fc | fb100 | 02 |
| 0200 | 02 | 000 | fc | fb100 | 02 |
| 0280 | 03 | 001 | fc | f917f | 02 |
| 02ff | 04 | 001 | fc | fa182 | 03 |
| 0302 | 05 | 001 | fc | f997e | 04 |
| 02fe | 06 | 001 | fc | f9583 | 05 |
| 0303 | 07 | 001 | fc | f9d84 | 06 |
| 0304 | 08 | 001 | fc | fa185 | 07 |
| 0305 | 09 | 001 | fc | fa16b | 08 |
| 02fb | 0a | 001 | fc | fa16e | 09 |
| 0306 | 0b | 001 | fc | fa2e2 | 0a |
| 02fa | 0c | 001 | fc | fa2ff | 0b |
| 0307 | 0d | 001 | fc | fc2f1 | 0c |
| 02f9 | 0e | 001 | fc | fc2fc | 0d |
| 02fc | 01 | 001 | fc | fb301 | 0e |
| all | ff | 000 | 00 | 00000 | ff |

TABLE VIII-continued

| reg. tbl address | new state | external action | hash gate | hash key | state check |
|---|---|---|---|---|---|
| others not used | | | | | |

Note: All numbers are in hexadecimal notation. The state check column indicates which state generated each regular table entry.

We claim:

1. A method for automatically interpreting data signals and control signals transmitted on a high speed bus, wherein the possible combinations of different data and control signals form a finite plurality of different states, the method comprising:
   monitoring data and control signals being transmitted on the bus;
   selectively storing said monitored data and control signals in a memory;
   generating a hash key from the stored signals;
   selecting data at substantially the same time from two distinct look-up tables respectively stored in a first reference memory and a second reference memory which are connected in parallel, said data of one of said look-up tables being selected by using the generated hash key to produce an entry address into said one look-up table;
   interpreting the state of the signals and choosing one of the two selected table data based on predetermined criteria; and
   using said selected table data to provide current state information.

2. A method for monitoring interfaced bus interactions as claimed in claim 1 wherein said selective storing step further comprises analyzing the monitored signals, detecting the presence of any unexpected data or unexpected control signals, and storing said signals upon said detection of unexpected data or control signals.

3. A method for monitoring interfaced bus interactions as claimed in claim 2 wherein said hash key is generated from stored signals that represent the current state of the automation.

4. A method for monitoring interfaced bus interactions as claimed in claim 2 and further including generating a signal to indicate whether the produced address is within the range of said one look-up table, and when said produced address is not within said range using said generated signal to select the data stored in said other look-up table.

5. A method for monitoring interfaced bus interactions as claimed in claim 3 wherein said one look-up table stores a first type of data representing regular actions and said other look-up table stores a second type of data representing default transitions; and wherein the entry address into said other look-up table is determined by the current state.

6. A method for monitoring interfaced bus interactions as claimed in claim 5 wherein the data in said one look-up table is chosen when the state check matches the current state, and the data in said other look-up table is chosen at least when there is no match.

7. A hardware electronic system connectable to a data and control signal bus for interpreting finite state automata, each finite state automatum (FSA) having a finite plurality of different states, said bus transmitting different sets of data and control signals at different clock times, said system comprising:
   input means detachably connectable to the bus for receiving the data and control signals;
   an addressable regular memory means for storing a plurality of regular codes, including a default memory address code and a hash key code;
   an addressable default memory means for storing a plurality of default codes, including a default memory address code and a hash key code;
   latching means selectively connected to said regular memory means and said default memory means for storing a default memory address code and a hash key code provided by said regular memory means or said default memory means;
   hash coder means connected to receive the data and control signals from said input means and connected to provide an output to said regular memory means, and also connected to receive a hash key code from said latching means, said hash coder means for interpreting the FSA state in response to said hash key code and in response to the received data and the control signals, and for generating a regular memory address and a selector signal;
   memory selector means connected to receive said selector signal from said hash coder means for selecting in response to said selector signal data from either said regular memory means or from said default memory means for storage in said latching means.

8. A hardware electronic system as claimed in claim 7 wherein said latching means stores said default memory address code and said hash key code during one clock time and said stored default memory address code is used during the next clock time to address said default memory means; and wherein said default memory means and said regular memory means are addressed and provide their respective stored codes during a single clock time.

9. A hardware electronic system as claimed in claim 7 and further including storage means connected to said input means for storing a sample of said data and control signals.

10. A hardware electronic system as claimed in claim 9 and further including a time stamp generator for providing a time stamp; and
   wherein said sample storing means further comprises means connected to said time stamp generating to receive the time stamp of when said sample was taken and storing said received time stamp with said stored sample.

11. A hardware electronic system as claimed in claim 7 and further including control means connected to a host computer for loading table data into said regular memory and into said default memory.

12. A hardware electronic system as claimed in claim 7 and further including bus trap means connected to said input means, said bus trap means including means for storing the received data signals and means for storing data templates, said bus trap means for comparing said data signals stored therein with said stored data templates.

13. A hardware electronic system as claimed in claim 7 and further including means for detecting a transition in the received control signals, said detecting means including means for generating clock signals upon said detection of a transition.

* * * * *